US009230382B2

(12) United States Patent
Smith

(10) Patent No.: US 9,230,382 B2

(45) Date of Patent: *Jan. 5, 2016

(54) DOCUMENT IMAGE CAPTURING AND PROCESSING

(71) Applicant: Vertifi Software, LLC, Burlington, MA (US)

(72) Inventor: Christopher Edward Smith, Brookline, NH (US)

(73) Assignee: Vertifi Software, LLC, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/712,162

(22) Filed: May 14, 2015

(65) Prior Publication Data

US 2015/0294523 A1 Oct. 15, 2015

Related U.S. Application Data

(63) Continuation-in-part of application No. 14/517,549, filed on Oct. 17, 2014, now abandoned, which is a continuation of application No. 14/202,164, filed on Mar. 10, 2014, now Pat. No. 8,897,538.

(60) Provisional application No. 61/869,814, filed on Aug. 26, 2013.

(51) Int. Cl.

| | |
|---|---|
| ***G06K 9/00*** | (2006.01) |
| ***G07D 7/12*** | (2006.01) |
| ***G07D 7/04*** | (2006.01) |
| ***G07D 7/20*** | (2006.01) |
| *G06F 17/00* | (2006.01) |

(52) U.S. Cl.

CPC .................. *G07D 7/122* (2013.01); *G07D 7/04* (2013.01); *G07D 7/2008* (2013.01); *G07D 7/2016* (2013.01); *G07D 7/2058* (2013.01)

(58) Field of Classification Search

USPC ......... 382/100, 103, 106, 112–113, 135–139, 382/155, 162, 168, 173, 181–189, 199, 209, 382/232, 254, 266, 274, 276, 286–292, 305, 382/312, 283, 165, 102, 140; 715/201, 210; 358/505; 348/154

See application file for complete search history.

(56) References Cited

U.S. PATENT DOCUMENTS

| | | | | |
|---|---|---|---|---|
| 8,417,059 | B2 * | 4/2013 | Yamada | G06T 7/0042 348/154 |
| 2009/0304299 | A1 * | 12/2009 | Motomura | G06T 3/4007 382/254 |
| 2012/0033876 | A1 * | 2/2012 | Momeyer | G06F 17/30781 382/165 |
| 2013/0022231 | A1 * | 1/2013 | Nepomniachtchi | G06Q 20/042 382/102 |

(Continued)

*Primary Examiner* — Seyed Azarian

(74) *Attorney, Agent, or Firm* — James C. Duda

(57) ABSTRACT

The present invention relates to the automated processing of documents and, more specifically, to methods and systems for aligning, capturing and processing document images using mobile and desktop devices. In accordance with various embodiments, methods and systems for document image alignment, capture, transmission, and verification are provided such that accurate data capture is optimized. These methods and systems may comprise capturing an image on a mobile or stationary device, analyzing images using iterative and weighting procedures, locating the edges or corners of the document, providing geometric correction of document images, converting the color image into a black and white image, transmitting images to a server, and testing the accuracy of the images captured and transmitted.

9 Claims, 16 Drawing Sheets

(56) References Cited

U.S. PATENT DOCUMENTS

2013/0155474 A1* 6/2013 Roach .................. G06Q 20/322
358/505

2013/0185618 A1* 7/2013 Macciola ............... H04N 1/387
715/201

* cited by examiner

| | | | | | | | | | | | | | | | |
|---|---|---|---|---|---|---|---|---|---|---|---|---|---|---|---|
| 1 | 0 | 1 | 0 | 1 | 0 | 1 | 0 | 1 | 0 | 1 | 0 | 1 | 0 | 1 | [Top three rows, 23 non-zero pixel values] |
| 0 | 1 | 0 | 1 | 0 | 1 | 0 | 1 | 0 | 1 | 0 | 1 | 0 | 1 | 0 | |
| 1 | 0 | 1 | 0 | 1 | 0 | 1 | 0 | 1 | 0 | 1 | 0 | 1 | 0 | 1 | |
| 0 | 0 | 0 | 0 | 0 | 0 | 0 | 0 | 0 | 0 | 0 | 0 | 0 | 0 | 0 | Gap 302 |
| 0 | 0 | 0 | 0 | 0 | 0 | 0 | 0 | 0 | 0 | 0 | 0 | 0 | 0 | 0 | |
| 0 | 0 | 0 | 0 | 0 | 0 | 0 | x | 0 | 0 | 0 | 0 | 0 | 0 | 0 | |
| 0 | 0 | 0 | 0 | 0 | 0 | 0 | 0 | 0 | 0 | 0 | 0 | 0 | 0 | 0 | Gap 304 |
| 0 | 0 | 0 | 0 | 0 | 0 | 0 | 0 | 0 | 0 | 0 | 0 | 0 | 0 | 0 | |
| -1 | 0 | -1 | 0 | -1 | 0 | -1 | 0 | -1 | 0 | -1 | 0 | -1 | 0 | -1 | [Bottom three rows, 23 negative pixel values] |
| 0 | -1 | 0 | -1 | 0 | -1 | 0 | -1 | 0 | 1 | 0 | -1 | 0 | -1 | 0 | |
| -1 | 0 | -1 | 0 | -1 | 0 | -1 | 0 | -1 | 0 | -1 | 0 | -1 | 0 | -1 | |

FIG. 3

402 404

| Left 3 cols, 23 neg. pixels | | | Gap | | | Gap | | Right 3 cols, 23 non-zero pixels | | |
|---|---|---|---|---|---|---|---|---|---|---|
| -1 | 0 | -1 | 0 | 0 | 0 | 0 | 0 | 1 | 0 | 1 |
| 0 | -1 | 0 | 0 | 0 | 0 | 0 | 0 | 0 | 1 | 0 |
| -1 | 0 | -1 | 0 | 0 | 0 | 0 | 0 | 1 | 0 | 1 |
| 0 | -1 | 0 | 0 | 0 | 0 | 0 | 0 | 0 | 1 | 0 |
| -1 | 0 | -1 | 0 | 0 | 0 | 0 | 0 | 1 | 0 | 1 |
| 0 | -1 | 0 | 0 | 0 | 0 | 0 | 0 | 0 | 1 | 0 |
| -1 | 0 | -1 | 0 | 0 | 0 | 0 | 0 | 1 | 0 | 1 |
| 0 | -1 | 0 | 0 | 0 | X | 0 | 0 | 0 | 1 | 0 |
| -1 | 0 | -1 | 0 | 0 | 0 | 0 | 0 | 1 | 0 | 1 |
| 0 | -1 | 0 | 0 | 0 | 0 | 0 | 0 | 0 | 1 | 0 |
| -1 | 0 | -1 | 0 | 0 | 0 | 0 | 0 | 1 | 0 | 1 |
| 0 | -1 | 0 | 0 | 0 | 0 | 0 | 0 | 0 | 1 | 0 |
| -1 | 0 | -1 | 0 | 0 | 0 | 0 | 0 | 1 | 0 | 1 |
| 0 | -1 | 0 | 0 | 0 | 0 | 0 | 0 | 0 | 1 | 0 |
| -1 | 0 | -1 | 0 | 0 | 0 | 0 | 0 | 1 | 0 | 1 |

FIG. 4

Kernel Box Blur Matrix

| | | | | | | | | | | | | | | |
|---|---|---|---|---|---|---|---|---|---|---|---|---|---|---|
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 1 | 1 | 0 | 1 | 0 | 1 | 0 | 1 | 0 | 1 | 0 | 1 | 0 | 1 | 1 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |

FIG. 8

DOCUMENT IMAGE CAPTURING AND PROCESSING

CROSS-REFERENCE TO RELATED APPLICATIONS

This application is a continuation-in-part of application Ser. No. 14/517,549, filed Oct. 17, 2014, entitled IMPROVED DOCUMENT IMAGE CAPTURING AND PROCESSING and claims priority benefit thereof, which in turns claims the priority benefit of application Ser. No. 14/202,164, filed Mar. 10, 2014, entitled IMPROVED DOCUMENT IMAGE CAPTURING AND PROCESSING, which in turns claims the benefit of Provisional Application Ser. No. 61/869,814, filed on Aug. 26, 2013 as a provisional application for the invention claimed herein and also entitled IMPROVED DOCUMENT IMAGE CAPTURING AND PROCESSING. application Ser. Nos. 14/517,549, 14/202,164 and Provisional Application Ser. No. 61/869,814 are entirely incorporated by reference herein as if set forth in full.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND

A number of technologies have been developed to provide businesses and consumers with the ability to transmit or deposit checks and other documents electronically via desktop and mobile devices. These technologies allow users to transmit instruments such as a check by sending an image from a device such as a scanner, cell phone, tablet device, or digital camera, in a matter of minutes. Users can snap a picture of a document such as a check using the camera in such devices and then transmit the document image for further processing, such as submission for deposit into an account. These technologies can save money for institutions by reducing item processing costs and labor expense, and can provide substantial convenience for businesses and individuals.

The issues that must be addressed by these technologies include capturing an accurate image of the document, effectively and efficiently communicating with the user regarding the adequacy of that image, and verifying the accuracy of the data capture from the image. Problems in reading the document may arise from finding the document within the photograph; accounting for uneven lighting conditions; addressing skewed, warped, or keystoned photographs; identifying the size and scale of the document; and using optical character recognition ("OCR") technology to read the document. Other technologies employ various tools to attempt to address these problems. These typically involve taking a photograph of the financial instrument, transmitting the photograph to a distant server, allowing the server software to evaluate the image, and, if the image is found inadequate, communicating the failure back to the user, who must then make appropriate adjustments and try again.

SUMMARY

Embodiments of the systems and methods described herein facilitate image capture and processing of images by providing enhancement of image capture and extraction of data. Some systems and methods described herein specifically involve a stationary or mobile communications device that optimizes the readability of the image it captures before transmission to a server for image quality testing and interpretation. Some embodiments provide efficient and effective means for testing the accuracy of data transmission and extraction.

The present invention involves methods and systems for capturing and processing document images using mobile and desktop devices. In accordance with various embodiments, methods and systems for capturing an image of a document are provided such that the image is optimized and enhanced for image transmission and subsequent analysis and data extraction. These methods and systems may comprise locating, aligning, and optimizing an image of a document, capturing the image in a photograph, finding the edges or corners of the document within the photograph to develop a cropped color image, scaling the image within a specified pixel range, converting the color image to a black and white image, transmitting the image to a server, and performing quality tests on the black and white image.

The invention also provides reliable edge detection of the document image using unique weighting, transformative, comparative, and evaluative testing processes at multiple pixel densities to improve the accuracy and reliability of the reading of the document once transmitted. The invention provides document recognition that is less affected by background contrast and lining. Ultimately, this results in cleaner images, as well as faster conversion time.

In some embodiments, the color image of the document also is transmitted to the server and additional tests are performed on said color image to confirm or enhance data interpretation. For example, a mobile communication device, such as a camera phone, would take a photograph of the document, convert it to black and white, and transmit it to a server where its quality may be further tested, while the color image may also be transmitted for testing and analysis.

Some embodiments of the invention may allow the user to transmit images of the documents using a mobile communication device such as, for example, a mobile telephone with a camera. Other embodiments of the invention may allow the users to transmit images of the documents using a desktop device or other stationary device such as, for example, a scanner and computer.

In accordance with some embodiments of the invention, methods and systems for document capture on a desktop or mobile device further comprise requiring a user to login to an application. In this way access to the document capture system using a mobile communication device might be limited to authorized users. The methods and systems may further comprise selecting a type of document and entering an amount. Some systems may receive a status of the document processing at the desktop or mobile device.

The present invention uses on-device software to provide immediate feedback to the user as to whether the quality of the document photograph is sufficient for processing. That feedback is provided without the need for intermediate communication with a server. The invention also provides geometric correction of the document image and uses unique weighting, iterative, comparative, and evaluative testing processes at multiple pixel densities to improve the accuracy and reliability of the reading of the document once transmitted. The invention provides greater compatibility with graphic processing units ("GPUs") in the color to black and white conversion process and is less affected by variances in luminosity across the check image. Ultimately, this results in cleaner images, as well as faster conversion time. The invention also provides better magnetic ink character recognition ("MICR") read rates and better "amount" read rates. In some embodiments, the invention transmits from the user device to the server a color image of the document in addition to the black and white images of the document. The color image can then be used, in combination with the black and white image, to more confidently read the document.

DESCRIPTION OF THE DRAWINGS

The present invention is described in detail with reference to the following figures. The drawings are provided for purposes of illustration only and merely to depict example embodiments of the invention. These drawing are for illustrative purposes and are not necessarily drawn to scale.

FIG. 3 provides an example of a "picket fence" unit matrix for calculating y-axis corner values.

FIG. 4 provides an example of such a "picket fence" unit matrix for calculating x-axis corner values.

FIG. 8 is an example of a kernel box blur matrix.

DETAILED DESCRIPTION

Figure 1:
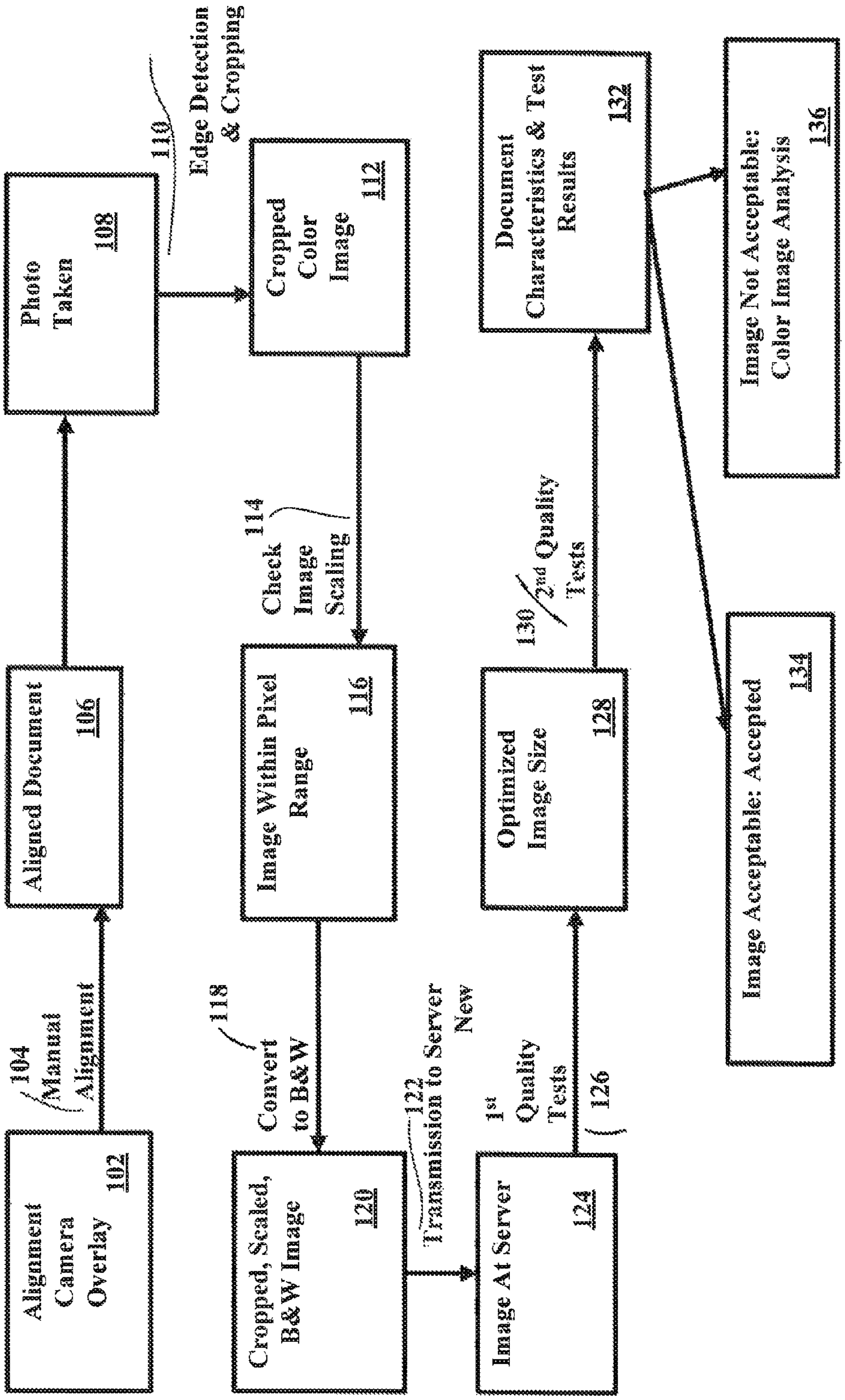
FIG. 1 is a process flow diagram showing the various processing steps the present invention embodies.

The present invention acquires, transmits, and tests images of the target document in the manner described below. FIG. 1 depicts the overall process encompassed by the invention.

I. Image Acquisition.

First, an alignment camera overlay 102 is provided that helps the user to focus a camera device on the target document. The device contains software that presents the user with an overlay on the camera view finder to assist the user in aligning 104 the document properly 106. The camera overlay provides a well defined sub-region within the view finder picture for location of the check document, and helps the user to ensure that the check is upright and reasonably aligned horizontally. In one embodiment, the sub-region within the view finder picture is provided with the use of software that allows recognition of the edges of the document. In another embodiment, the software allows recognition of the corners of the document. The alignment device then correlates alignment guides on the view finder of the picture-taking device to allow the user to align the document within the guides. In this way, the real-time corner/edge detection software provides graphical cues to the user on the overlay that the document is being properly located within the camera view.

Data may be provided to the user that the image within the view finder is insufficiently aligned. For example, the overlay in the viewfinder on the user device may present the user with corner indicators as the corners are detected in the view finder. The software within the device may calculate the relative height or vertical alignment of adjacent corners, and portray the estimated corners in the viewfinder in one color if sufficiently aligned and another color if insufficiently aligned.

The camera device is then used to take a picture 108 of the front of the document. It may also be used to take a picture of the back of the document. The edges or corners of the image of the document within the photograph are then found 110.

II. Edge and Corner Detection: "Picket Fence" and Cropping Technique

Figure 2:
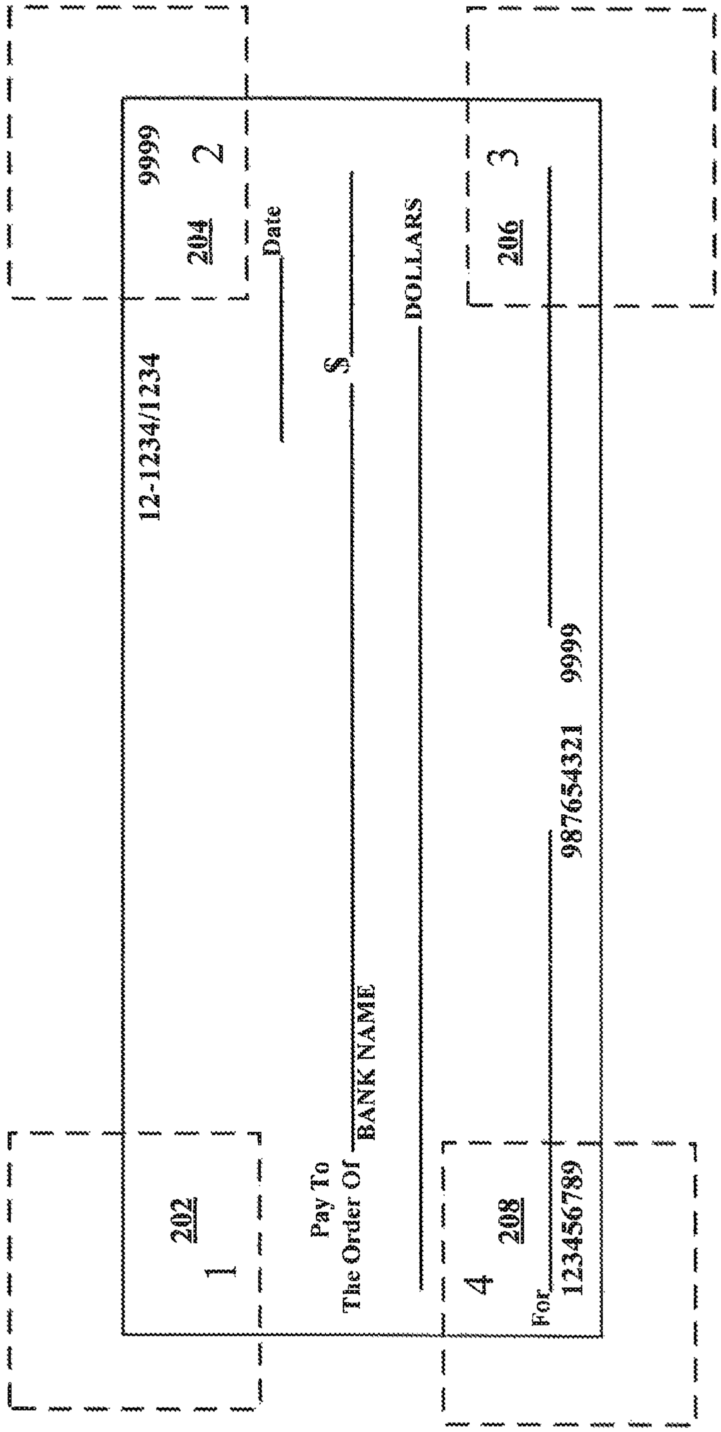
FIG. 2 provides an example of document image Subregions.

In some embodiments of the invention, the corners of the document may be found utilizing an iterative "picket fence" and cropping technique. This may be done in smaller subregions (the "Subregions") that are created as an overlay of the viewport. FIG. 2 provides an example of such a Subregion. Four such Subregions, each including a corner of the document image, are created, each spanning a rectangle that is a set percentage of the horizontal width (for example, 20%) and another set percentage of the vertical height (for example, 40%) of the viewport. For example, the four Subregions may be defined in some order of the following:

1. upper left 204, starting from top left, go 20% of check width to the right, then down 40% of height;
2. upper right 206, starting from top right, go 20% of check width to the left, then down 40% of height;
3. bottom right 208, starting from bottom right, go 20% of check width to the left, then up 40% of height; and
4. bottom left 210, starting from bottom left, go 20% of check width to the right, then up 40% of height.

A device may be provided that measures the luminosity of each pixel within the image or a Subregion. The edges or corners of the image of the document image are then found measuring the luminosity of pixels in a fixed set of columns (a "picket fence"). For example, the top edge of the image of the financial document may be searched from the top-down of the image or Subregion (defined by the camera overlay). When a change in average luminosity above a fixed threshold is sensed, a document edge is identified. The bottom edge may then be searched form the bottom-up of the sub-region, similarly identifying the document edge on the basis of a change in average luminosity. The axes are then changed, and the process is repeated in order to find the right and left side images of the check image document.

In some embodiments, after the luminosity of the pixels is measured, a "blurring" process is applied to remove localized pixel luminosity variance by averaging luminosity in small regions about each pixel within a Subregion. This may be done by weighting each pixel proportionately by the luminosity of its neighboring pixels. For example, where $P_{R,C}$ is the pixel luminosity in row R and column C of the Subregion, then a given range of pixels to the left, right, above, and below, such as $$\begin{matrix} P_{R-2,C-2} & P_{R-2,C-1} & P_{R-2,C} & P_{R-2,C+1} & P_{R-2,C+2} \\ P_{R-1,C-2} & P_{R-1,C-1} & P_{R-1,C} & P_{R-1,C+1} & P_{R-1,C+2} \end{matrix}$$

-continued $$
\begin{matrix}
P_{R,C-2} & P_{R,C-1} & P_{R,C} & P_{R,C+1} & P_{R,C+2} \\
P_{R+1,C-2} & P_{R+1,C-1} & P_{R+1,C} & P_{R+1,C+1} & P_{R+1,C+2} \\
P_{R+2,C-2} & P_{R+2,C-1} & P_{R+2,C} & P_{R+2,C+1} & P_{R+2,C+2}
\end{matrix}
$$

may be multiplied by a set of corresponding weighting, or "blur" factors, or Blur Kernel, such as $$
\begin{matrix}
B_{R-2,C-2} & B_{R-2,C-1} & B_{R-2,C} & B_{R-2,C+1} & B_{R-2,C+2} \\
B_{R-1,C-2} & B_{R-1,C-1} & B_{R-1,C} & B_{R-1,C+1} & B_{R-1,C+2} \\
B_{R,C-2} & B_{R,C-1} & B_{R,C} & B_{R,C+1} & B_{R,C+2} \\
B_{R+1,C-2} & B_{R+1,C-1} & B_{R+1,C} & B_{R+1C+1} & B_{R+1,C+2} \\
B_{R+2,C-2} & B_{R+2,C-1} & B_{R+2,C} & B_{R+2,C+1} & B_{R+2,C+2}
\end{matrix}
$$

The blurred value of $P_{R,C}$, or $P'_{R,C}$, is set to be the sum of the products of the neighborhood pixels and their respective blur factors, divided by the sum of the blur factors. That is:

$$(P_{R-2,C-2}\times B_{R-2,C-2})+(P_{R-2,C-1}\times B_{R-2,C-1})+(P_{R-2,C}\times B_{R-2,C})+(P_{R-2,C+1}\times B_{R-2,C+1})+(P_{R-2,C+2}\times B_{R-2,C22})+(P_{R-1,C-2}\times B_{R-1,C-2})+(P_{R-1,C-1}\times B_{R-2,C-1})+\ldots+(P_{R+2,C+2}\times B_{R+2,C+2})$$

or $$\Sigma(Pi_j \times B_{i,j}) \text{ for } _{i=R-2,\, j=C-2} \text{ to } _{i=R+2,\, j=C+2}$$

divided by $$B_{R-2,C-2}+B_{R-2,C-1}+B_{R-2,C}+B_{R-2,C+1}+B_{R-2,C+2}+B_{R-1,C-2}+\ldots+B_{R+2,C+2}$$

or $$\Sigma(B_{i,j}) \text{ for } _{i=R-2,\, j=C-2} \text{ to } _{i=R+2,\, j=C+2}$$

That is: $P'_{R,C}=[\Sigma(Pi_j \times B_{i,j})$ for $_{i=R-2,\ j=C-2}$ to $_{i=R+2,\ j=C+2}]/[\Sigma(B_{i,j})$ for $_{i=R-2,\ j=C-2}$ to $_{i=R+2,\ j=C+2}]$ Numerical Example Luminosity (L) may be defined as L=0.299R+0.587G+0.114B, where R=red, G=green, B=blue channel colors. Luminosity values of pixels may range from 0 to 255. The values of pixels for a subarea within the upper left Subregion of the document may be measured by the device around the pixel $P_{R,C}$ (96) as:

| | | | | |
|---|---|---|---|---|
| 100 | 110 | 100 | 108 | 106 |
| 100 | 102 | 98 | 102 | 112 |
| 100 | 102 | 96 | 104 | 108 |
| 100 | 104 | 100 | 108 | 106 |
| 100 | 112 | 102 | 112 | 104 |

Each pixel in the Subregion may then be run through a weighting matrix such as (where, in this example, $B_{R,C}$=5):

| | | | | |
|---|---|---|---|---|
| 1 | 1 | 2 | 1 | 1 |
| 1 | 3 | 4 | 3 | 1 |

-continued

| | | | | |
|---|---|---|---|---|
| 2 | 4 | 5 | 4 | 2 |
| 1 | 3 | 4 | 3 | 1 |
| 1 | 1 | 2 | 1 | 1 |

That is, each "blur" number in the above matrix is the multiple by which its corresponding pixel is multiplied when evaluating pixel $P_{R,C}$ (96). Thus, in this example, the pixel of concern, $P_{R,C}$ (96), is weighted most heavily, and pixels are weighted less heavily as one moves away from the pixel of concern. If each pixel in the neighborhood of $P_{R,C}$ (96) is multiplied by its corresponding blur factor, a new matrix can be created; that is, each $Pi_j \times B_{i,j}$ value using the above values would be:

| | | | | |
|---|---|---|---|---|
| 100 | 110 | 200 | 108 | 106 |
| 100 | 306 | 392 | 306 | 112 |
| 200 | 408 | 480 | 416 | 216 |
| 100 | 312 | 400 | 324 | 106 |
| 100 | 112 | 204 | 112 | 104 |

Taking the sum of these, that is, $[\Sigma(P_{i,j} \times B_{i,j})$ for $_{i=R-2,\ j=C-2}$ to $_{i=R+2,\ j=C+2}]$=5434. Divide this by the sum of the weights; in this case 53 (i.e., the sum of 1+1+2+1+1+1+3+4+3+1+2+4+5+4+2+1+3+ . . . +1 [as determined by $\Sigma(B_{i,j})$ for $_{i=R-2,\ j=C-2}$ to $_{i=R+2,\ j=C+2}$]). So that $$P'_{R,C}(96) = [\Sigma(Pi_j \times B_{i,j}) \text{ for } _{i=R-2,j=C-2} \text{ to } _{i=R+2,j=C+2}]/[\Sigma(B_{ij}) \text{ for } _{i=R-2,j=C-2} \text{ to } _{i=R+2,j=C+2}] = 5434/53 = 102.5$$

Thus, the "blurred" luminosity value of the pixel in this example, $P'_{R,C}$ (96), with an actual value of 96 is 102.5.

Each pixel in the Subregion is treated accordingly, and a new, "blurred" version of the original pixel grid for the image is created. The effect is a smoothed set of image values, where random, sharp spikes of luminosity have been eliminated, thus helping to more definitively identify where the actual substantive changes in luminosity, and thus the edges, are located in the image. The blurred values of luminosity can then be used to find the edges of the document.

In some embodiments of the invention, the blurred pixel values are used to determine the x and y coordinates for each corner of the document. This may be done as described below. The order presented below for determination of each coordinate and as applied to each corner location is by way of example only.

Candidate horizontal edge locations for the document are determined by evaluating samples of blurred pixel values above and below potential edge points to identify significant changes in luminosity in a generally vertical direction. This may be accomplished by testing values along a column (or otherwise in a generally vertical direction) of the blurred pixel values as determined above, to identify significant transitions.

This step may also be aided by creating a "picket fence" of pixel values to be included in each evaluation, by using a unit matrix of the following form, where X is the pixel location to be evaluated. FIG. 3 provides an example of such a unit matrix. In this step, as suggested by the following example, one or more rows of pixels above and below the point of interest 302, 304 may be skipped ("Gap"): (1) to help account for some skewing of the image that may have occurred when captured; and (2) to more efficiently identify the approximate image edge due to the somewhat broader luminosity transition area across several rows of pixels caused by the blurring.

If the location of the target blurred pixel P' to be evaluated is identified as $X_{a,b}$, then each of the other corresponding unit values can be identified by $X_{a\pm i,\ b\pm j}$, where i and j designate the number of rows and columns, respectively, from $X_{a,b}$ that the value is located in the matrix.

The blurred pixel values around each pixel are then adjusted to help evaluate the likelihood that the y-axis location of each blurred pixel in the Subregion is a location of image transition. This may be done by multiplying the neighboring blurred pixel values of each blurred pixel by the corresponding unit value in the unit matrix of FIG. 3. That is, in the above example, a new matrix may be created for each blurred pixel value $P_{a,b}$ by multiplying each pixel in its neighborhood, $P_{a\pm i,\ b\pm j}$, by its corresponding unit value at $X_{a\pm i,\ b\pm j}$ (that is, $P_{a\pm i,\ b\pm j}\cdot X_{a\pm i,\ b\pm j}$). In this example, there will be 23 non-zero values above, and 23 non-zero values below, the target pixel value, $P_{a,b}$.

Average luminosity differences are then calculated to determine candidate locations for the y-coordinate of the horizontal edge or the corner. The resulting values in the rows above the target pixel are summed, as are the resulting values of the rows of pixels below the target pixel. The difference between the two sums is then calculated (the "Upper/Lower Blurred Pixel Sum Diff"). If the Upper/Lower Blurred Pixel Sum Diff exceeds a specified threshold, that pixel location is a candidate location for the vertical (y-axis) location of the horizontal edge. In such a case, both the y-axis location of the "edge" candidate pixel and its Upper/Lower Blurred Pixel Sum Diff (the difference of "above" and "below" totals for that pixel) are recorded. The results of the y-axis location of the candidate "edge" pixel location and its Blurred Pixel Sum Diff are tabled. When 12 such significant y-axis edge locations and corresponding Blurred Pixel Sum Diffs have been identified moving horizontally through the Subregion, the process stops and a single edge y-coordinate is calculated.

This calculation may be accomplished on the device by use of histograms. For example, for each pixel location identified as a candidate "edge" location, the device may calculate how many other pixel locations within the table, created as described above, have y-values within some specified y-value range. This creates a third, histogram ("H") column of frequency of y-axis values within that y value range, an example of which is shown below.

| Pixel Column | y-value of candidate pixel | H | Upper/Lower Blurred Pixel Sum Diff |
|---|---|---|---|
| 1 | 125 | 10 | 20 |
| 2 | 127 | 9 | 22 |
| 3 | 120 | 10 | 24 |
| 4 | 140 | 1 | 20 |
| 5 | 122 | 10 | 18 |
| 6 | 124 | 9 | 16 |
| 7 | 118 | 9 | 17 |
| 8 | 120 | 10 | 20 |
| 9 | 135 | 4 | 10 |
| 10 | 121 | 9 | 21 |
| 11 | 125 | 10 | 19 |
| 12 | 130 | 8 | 22 |

The location for the edge or corner will be chosen as the y-value with both the highest H value (i.e., the one with the greatest number of other nearby y-axis edge locations within that y-axis range) and, if more than one location with the same H value, the location with that H value with the greatest corresponding luminosity difference ("tie breaker"). In this example, the selected y-value would be 120.

A similar analysis is conducted using the same blurred set of pixel values for the quadrant Subregion, except that candidate locations along a second coordinate axis, for example the x-axis, are identified to determine the second coordinate for the edge corner in that quadrant. Candidate vertical edge locations are determined by evaluating samples of blurred pixels to the left and to the right of potential edge points to identify significant changes in luminosity in a generally horizontal direction. This may be accomplished by testing values along a row (or otherwise in a general horizontal direction) of the blurred pixel values as determined above, to identify significant transitions.

This step also may also be aided by creating a "picket fence" of pixel values to be included in each evaluation, by using a unit matrix of the form shown in FIG. 4, where X is the pixel location to be evaluated. In this step, as suggested by the following example, one or more columns of pixels to the left and to the right of the point of interest 402, 404 may be skipped ("Gap") for the same reasons as discussed above; that is: (1) to help account for some skewing of the image that may have occurred when the image was captured; and (2) to more efficiently identify the approximate image edge due to the somewhat broader luminosity transition area across several columns of pixels caused by the blurring.

As above, if the location of the target blurred pixel P' to be evaluated is identified as $X_{a,b}$, then each of the other corresponding unit values can be identified by $X_{a\pm i,\ b\pm j}$, where i and j designate the number of rows and columns, respectively, from $X_{a,b}$ that the value is located in the matrix.

Similar to the evaluation of the location of the y coordinate of the horizontal edge, the likelihood that the x-axis location of each blurred pixel in the Subregion is the location of transition for the vertical axis is evaluated by multiplying its neighboring blurred pixel values by the corresponding unit value in the unit matrix of FIG. 4. That is, in the above example, a new matrix is created for each blurred pixel value $P_{a,b}$ by multiplying each pixel in its neighborhood, $P_{a\pm i,\ b\pm j}$, by its corresponding unit value at $X_{a\pm i,\ b\pm j}$ (that is, $P_{a\pm i,\ b\pm j}\cdot X_{a\pm i,\ b\pm j}$). In this example, there will be 23 non-zero values to the left of, and 23 non-zero values to the right of, the target pixel value, $P_{a,b}$.

The resulting values in the columns to the left of the target pixel are summed, as are the resulting values of the columns of pixels to the right of the target pixel. The difference between the two sums is then calculated (the "Left/Right Blurred Pixel Sum Diff"). If the Left/Right Blurred Pixel Sum Diff exceeds a specified threshold, that pixel location is a candidate location for the horizontal (x-axis) location of the vertical edge. In such case, the device records both the x-axis location of the "edge" candidate pixel and its Left/Right Blurred Pixel Sum Diff (the difference of "left" and "right" totals for that pixel). The results of the x-axis location of the candidate "edge" pixel location and its Left/Right Blurred Pixel Sum Diff are tabled. When the device identifies 12 such significant x-axis edge locations and corresponding Left/Right Blurred Pixel Sum Diffs moving through the Subregion, the process stops and a single edge x-coordinate is calculated as described below.

Similar to determining the location of the horizontal edge, for each pixel location identified as a candidate "edge" or corner location, calculate how many other pixel locations within the table have x-values within some specified x-value range. This creates a histogram ("H") column of frequency of x-axis values within that x value range, an example of which is shown below.

| Pixel Row | x-value of candidate pixel | H | Left/Right Blurred Pixel Sum Diff |
|---|---|---|---|
| 1 | 47 | 10 | 20 |
| 2 | 44 | 9 | 22 |
| 3 | 45 | 10 | 24 |
| 4 | 30 | 1 | 20 |
| 5 | 40 | 7 | 26 |
| 6 | 44 | 9 | 16 |
| 7 | 39 | 6 | 20 |
| 8 | 41 | 7 | 19 |
| 9 | 43 | 8 | 21 |
| 10 | 29 | 1 | 18 |
| 11 | 45 | 10 | 19 |
| 12 | 35 | 5 | 22 |

The location for the edge will be chosen as the x-value with both the highest H value (i.e., the one with the greatest number of other nearby x-axis edge locations within that x-axis range) and, if more than one location with the same H value, the location with that H value with the greatest corresponding luminosity difference ("tie breaker"). In this example, the selected x-value would be 45.

Thus, the upper left coordinates 502 of the image, that is, corner 1, in this example would be $x_{c1},y_{c1}$=45, 120. See FIG. 5.

The process may then be repeated for each of the quadrant Subregions to determine $x_{ci},y_{ci}$ coordinates for each corner of check image; that is, in addition to $x_{c1},y_{c1}$ (corner 1) 502, determine $x_{c2},y_{c2}$ (corner 2) 504; $x_{c3},y_{c3}$ (corner 3) 506 and $x_{c4},y_{c4}$ (corner 4) 508 using the above methodology applied to each quadrant Subregion. If one corner cannot be identified using the above methodology, that corner may be assigned the x coordinate of its vertically adjacent corner and y coordinate of its horizontally adjacent corner. If more than one corner cannot be identified, the process cannot be completed and the image is rejected. Completion of the process defines a quadrilateral 510. An example is presented in FIG. 5.

Figure 6:
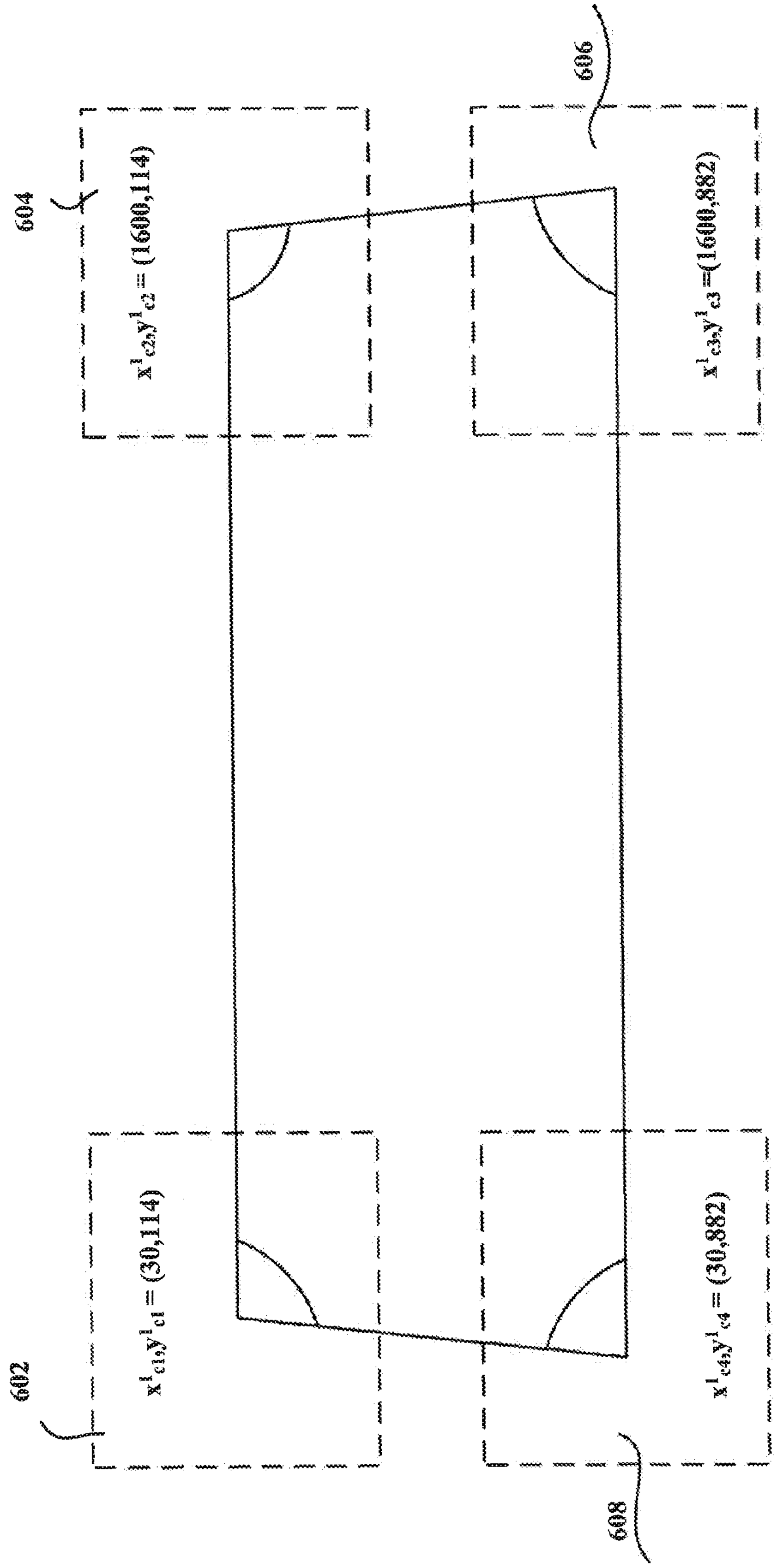
FIG. 6 provides an example of a cropping rectangle.

In some embodiments, a cropping, or enclosing, rectangle with cropping corners ($x'_{ci},y'_{ci}$) (see FIG. 6) is constructed using the coordinates for the corners calculated above. For example, assuming increasing x coordinate values from left to right, and increasing y coordinate values from top to bottom, the coordinates of the cropping rectangle may be determined as follows:

For left upper cropping corner (cropping corner 1) 602 of cropping rectangle ($x'_{c1},y'_{c1}$);

$x'_{c,1}$=lesser of two x-coordinates for the left two corners; that is min ($x_{c1},x_{c4}$)

$y'_{c,1}$=lesser of two y-coordinates for upper two corners; that is, min ($y_{c1},y_{c2}$)

For right upper cropping corner (cropping corner 2) 604 of cropping rectangle ($x'_{c2},y'_{c2}$):

$x'_{c,2}$=greater of two x-coordinates for the right two corners; that is, max ($x_{c2},x_{c3}$)

$y'_{c,2}$=lesser of two y-coordinates for upper two corners; that is, min ($y_{c1},y_{c2}$) [i.e., same as for left upper]

For right lower corner (corrected corner 3) 606 of cropping rectangle ($x'_{c3},y'_{c3}$):

$x'_{c,3}$=greater of two x-coordinates for the right two corners; that is, max ($x_{c2},x_{c3}$) [same as for right upper], $y'_{c,3}$=greater of two y-coordinates for lower two corners; that is, min ($y_{c3},y_{c4}$)

For left lower corner (corrected corner 4) 608 of cropping rectangle ($x'_{c4},y'_{c4}$):

$x'_{c,4}$=lesser of two x-coordinates for the right two corners; that is min ($x_{c1}$, $x_{c4}$) [i.e., same as for left upper], $y'_{c,4}$=greater of two y-coordinates for lower two corners min ($y_{c3},y_{c4}$) [same as for right lower].

This cropping rectangle will fully contain the four original corners 502, 504, 506, 508 that have been previously located.

III. Edge and Corner Detection: Edge Value and Cluster Technique

Figure 9:
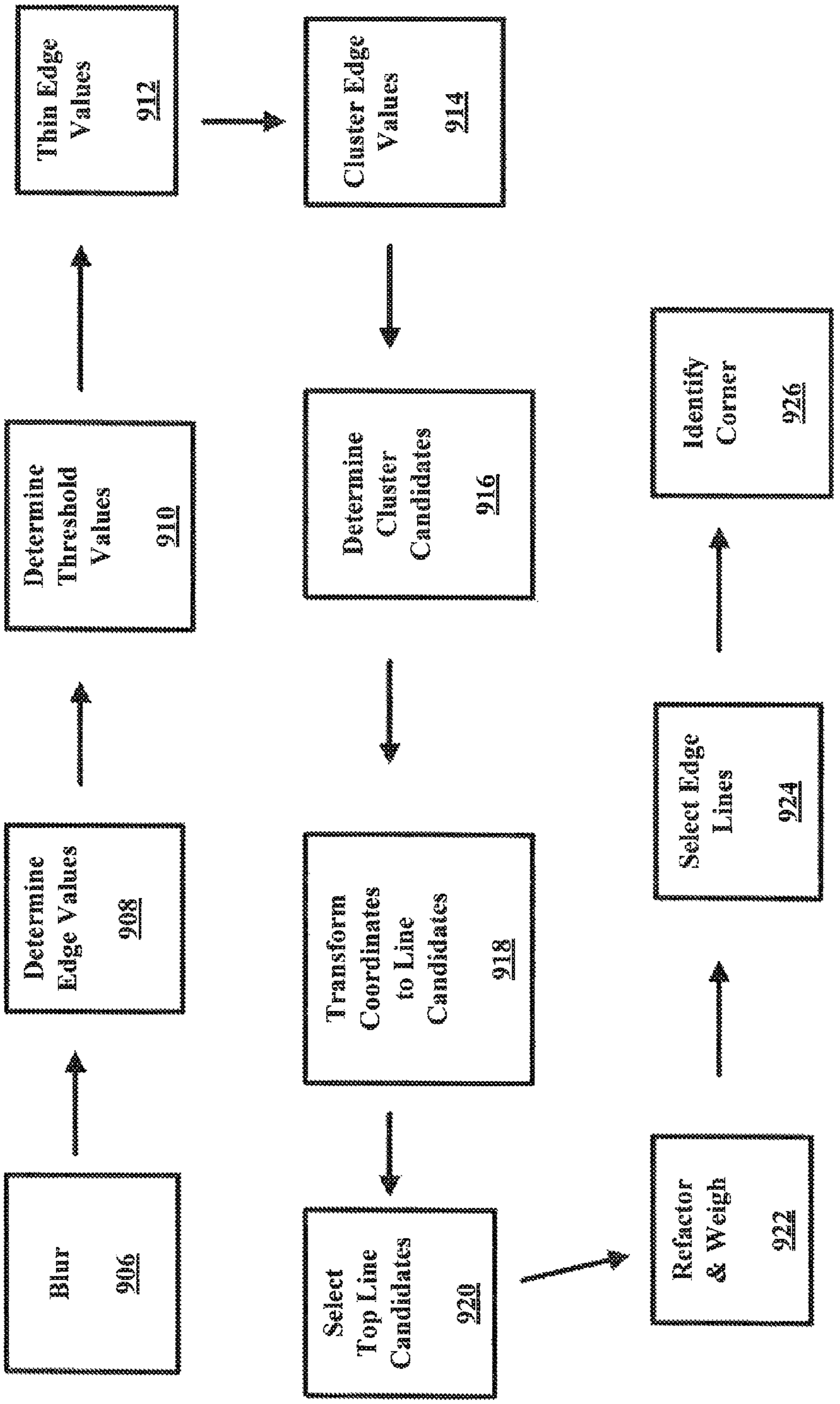
FIG. 9 is a process flow diagram showing the various processing steps the present invention embodies for the edge values and clustering technique for edge detection.

In some embodiments of the invention, the location of the document edges and corners may be identified by determining the "strength," or magnitude, of luminosity differences about each pixel location, clustering candidate pixel edge locations, utilizing coordinate conversion to develop candidate edge lines, and employing statistical analysis to determine each edge. FIG. 9 depicts the overall process encompassed by this technique for edge and corner detection. Calculation of the edge values, or "edge strength" differentials, may be done for both the vertical and the horizontal direction, as described below.

A. Luminosity Measurement and Blurring

As described above, after the device acquires an image, it may measure the luminosity of each pixel within the image or subregion of the image. After the luminosity of the pixels is measured, the device may apply a "blurring" process 906 to minimize localized pixel luminosity variance by averaging luminosity in small regions about each pixel. Also as discussed, above, it may do this by weighting each pixel proportionately by the luminosity of its neighboring pixels. For example, where $P_{R,C}$ is the luminosity of the pixel whose location may be identified as R and column C of the image region, then the device may multiply a given range of pixels to the left, right, above, and below, such as

| | | |
|---|---|---|
| $P_{R-1,C-1}$ | $P_{R-1,C}$ | $P_{R-1,C+1}$ |
| $P_{R,C-1}$ | $P_{R,C}$ | $P_{R,C+1}$ |
| $P_{R+1,C-1}$ | $P_{R+1,C}$ | $P_{R+1,C+1}$ |

by a set of corresponding weighting, or "blur" factors B or blur kernel, such as

| | | |
|---|---|---|
| $B_{R-1,C-1}$ | $B_{R-1,C}$ | $B_{R-1,C+1}$ |
| $B_{R,C-1}$ | $B_{R,C}$ | $B_{R,C+1}$ |
| $B_{R+1,C-1}$ | $B_{R+1,C}$ | $B_{R+1C+1}$ |

The device may set the blurred value of $P_{R,C}$, or $P'_{R,C}$ to be the weighted sum of the products of the neighborhood pixels and their respective blur factors, divided by the sum of all weights. For example, the device may apply the following relations:

$$(P_{R-1,C-1}\times B_{R-1,C-1})+(P_{R-1,C}\times B_{R-1,C})+(P_{R-1,C+1}\times B_{R-1,C+1})+(P_{R,C-1}\times B_{R,C-1})+(P_{R,C}\times B_{R,C})+(P_{R,C+1}\times B_{R,C+1})+(P_{R+1,C-1}\times B_{R+1,C-1})+(P_{R+1,C}\times B_{R+1,C})+(P_{R+1,C+1}\times B_{R+1,C+1})$$

or $$\Sigma(Pi_j\times B_{i,j}) \text{ for }_{i=R-1,\, j=C-1} \text{ to }_{i=R+1,\, j=C+1}$$

divided by $B_{R-1,C-1}+B_{R-1,C}+B_{R-1,C+1}+B_{R,C-1}+B_{R,C}+B_{R,C-1}+\ldots+B_{R+1,C+1}$ or $\Sigma(B_{i,j})$ for $_{i=R-1,\,j=C-1}$ to $_{i=R+1,\,j=C+1}$ That is: $P'_{R,C}=[\Sigma(Pi_j \times B_{i,j})$ for $_{i=R-1,\,j=C-1}$ to $_{i=R+1,\,j=C+1}]/[\Sigma(B_{i,j})$ for $_{i=R-1,\,j=C-1}$ to $_{i=R+1,\,j=C+1}]$ Thus, for example, if the device were to set the Blur Kernel as:

| | | |
|---|---|---|
| 1 | 2 | 1 |
| 2 | 3 | 2 |
| 1 | 2 | 1 |

then, for each pixel set, the blurred pixel values would be given by:

$$P'_{R,C}=((3*P_{R,C})+(2*P_{R,C-1})(2*P_{R,C+1})+(2*P_{R-1,C})+(2*P_{R+1,C})+(P_{R-1,C-1})+(P_{R+1,C-1})+(P_{R-1,C+1})+(P_{R+1,C+1}))/15$$

The corresponding blurred values, $P'_{R,C}$, would be the input image within the device that it would use for further processing.

The device may calculate a luminosity (L) value as L=0.299R+0.587G+0.114B, where R=red, G=green, B=blue channel colors. Luminosity values of pixels may range from 0 to 255. By way of example, the device may measure the values of pixels for a subarea around the pixel $P_{R,C}$ (96) within the upper quadrant of the document as:

| | | |
|---|---|---|
| 102 | 98 | 102 |
| 102 | 96 | 104 |
| 104 | 100 | 108 |

It may then run each pixel through a weighting matrix, or blur kernel, such as:

| | | |
|---|---|---|
| 1 | 2 | 1 |
| 2 | 3 | 2 |
| 1 | 2 | 1 |

That is, each "blur" number in the above matrix is the factor by which the device multiplies its corresponding pixel when evaluating pixel $P_{R,C}$ (96). Thus, in this example, the pixel of concern, $P_{R,C}$ (96), is weighted most heavily, and pixels are weighted less heavily as one moves away from the pixel of concern. If each pixel in the neighborhood of $P_{R,C}$ (96) is multiplied by its corresponding blur factor, a new matrix can be created; that is, each $Pi_j \times B_{i,j}$ value using the above values would be:

| | | |
|---|---|---|
| 102 | 196 | 102 |
| 204 | 288 | 208 |
| 104 | 200 | 108 |

Taking the sum of these, that is, $[\Sigma(P_{i,j} \times B_{i,j})$ for $_{i=R-1,\,j=C-1}$ to $_{i=R+1,\,j=C+1}]=1512$. Divide this by the sum of the weights; in this case 15 (i.e., the sum of 1+2+1+2+3+2+1+2+1 [as determined by $\Sigma(B_{i,j})$ for $_{i=R-1,\,j=C-1}$ to $_{i=R+1,\,j=C+1}$]). So that $$P'_{R,C}(96)=[\Sigma(Pi_{,j}\times B_{i,j})\ \text{for}_{i=R-1,j=C-1}\ \text{to}_{i=R+1,j=C+1}]/[\Sigma(B_{ij})\ \text{for}_{i=R-1,j=C-1}\ \text{to}_{i=R+1,j=C+1}]=1512/15=100.8$$

Thus, the "blurred" luminosity value of the pixel in this example, $P'_{R,C}$ (96), with an actual value of 96 is 100.8.

The device treats each pixel accordingly, and a new, "blurred" version of the original pixel grid for the image is created. The effect is a smoothed set of image values, where random, sharp spikes of luminosity have been eliminated, thus helping to more definitively identify where the actual substantive changes in luminosity, and thus the edges, are located in the image. The blurred values of luminosity can then be used to find the edges of the document. This procedure may be conducted within subregions of the document image.

B. Quadrant Subregions

Figure 10:
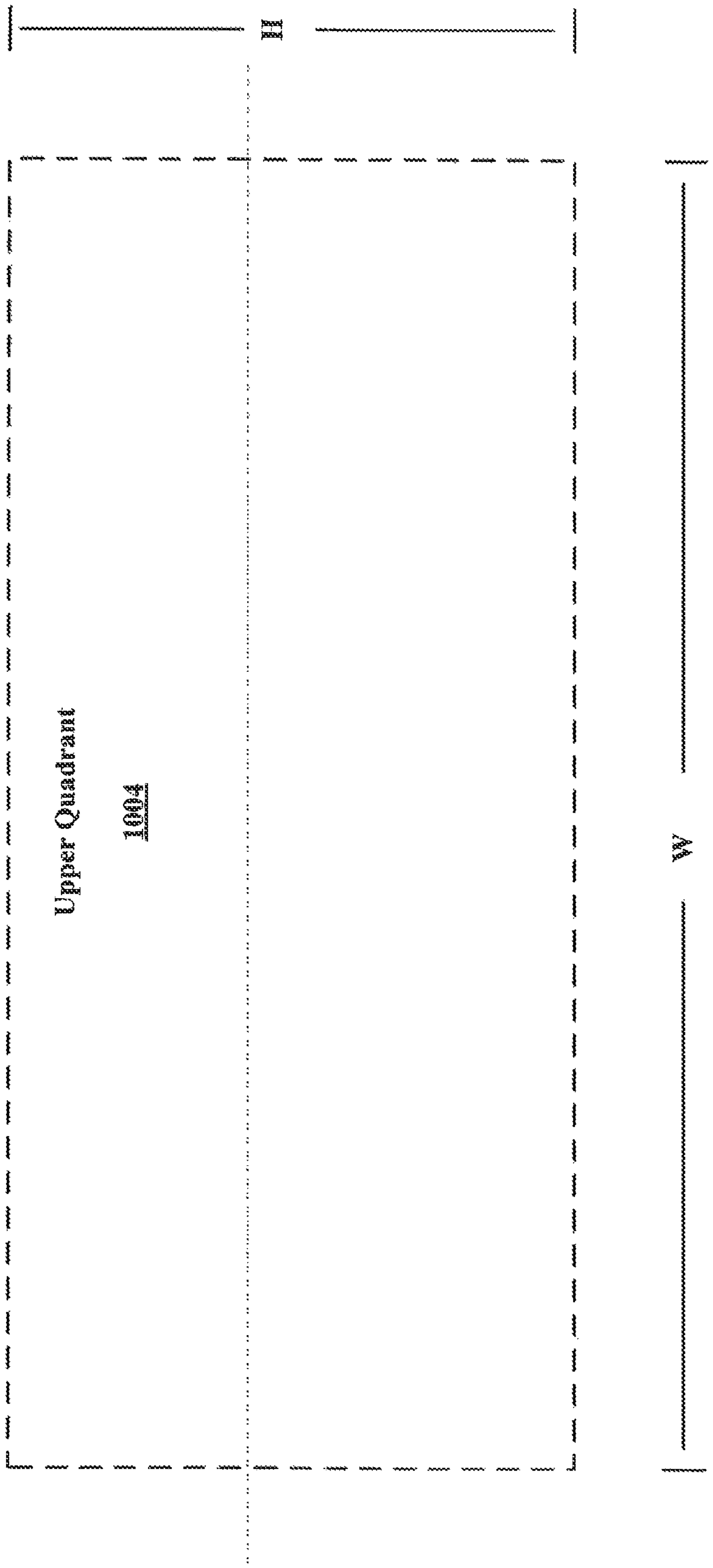
FIG. 10 provides an example of document image Upper Quadrant
Figure 11:
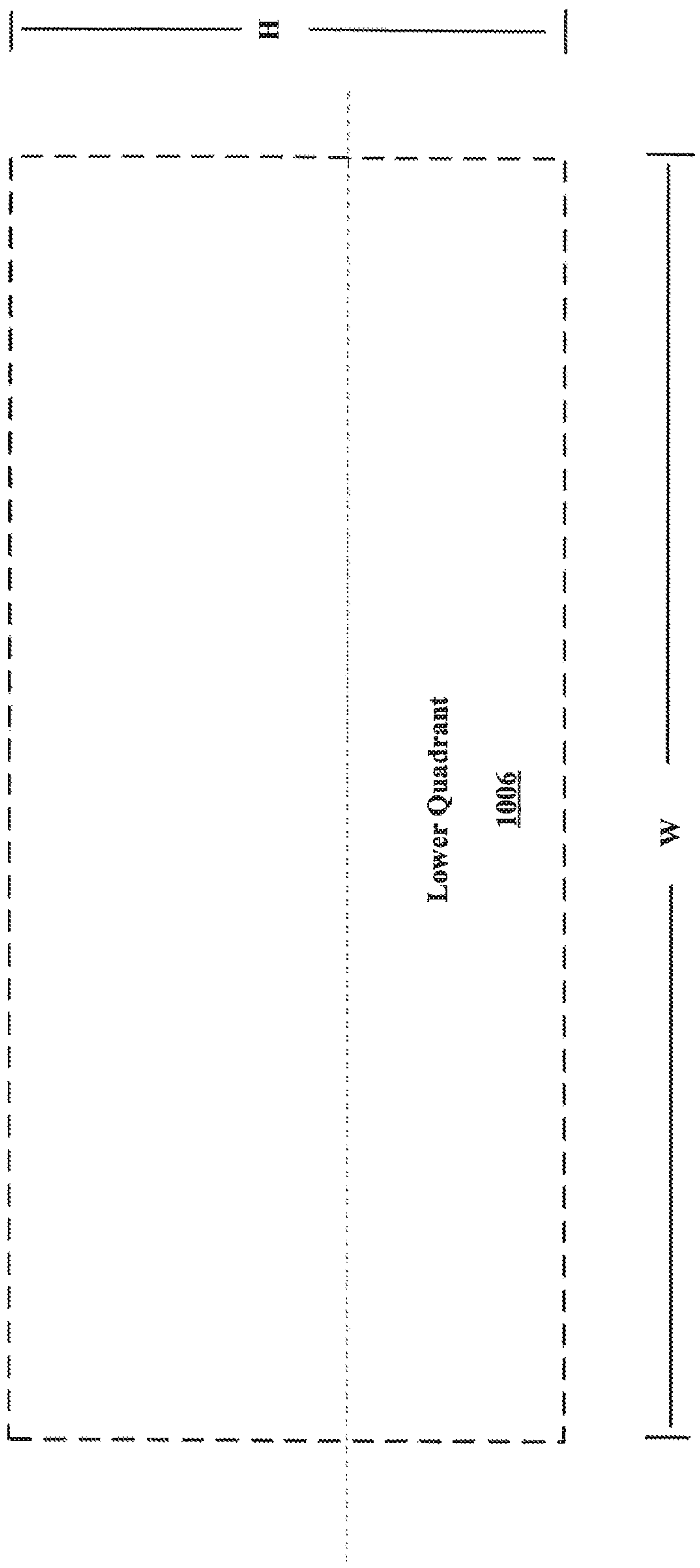
FIG. 11 provides an example of document image Lower Quadrant
Figure 12:
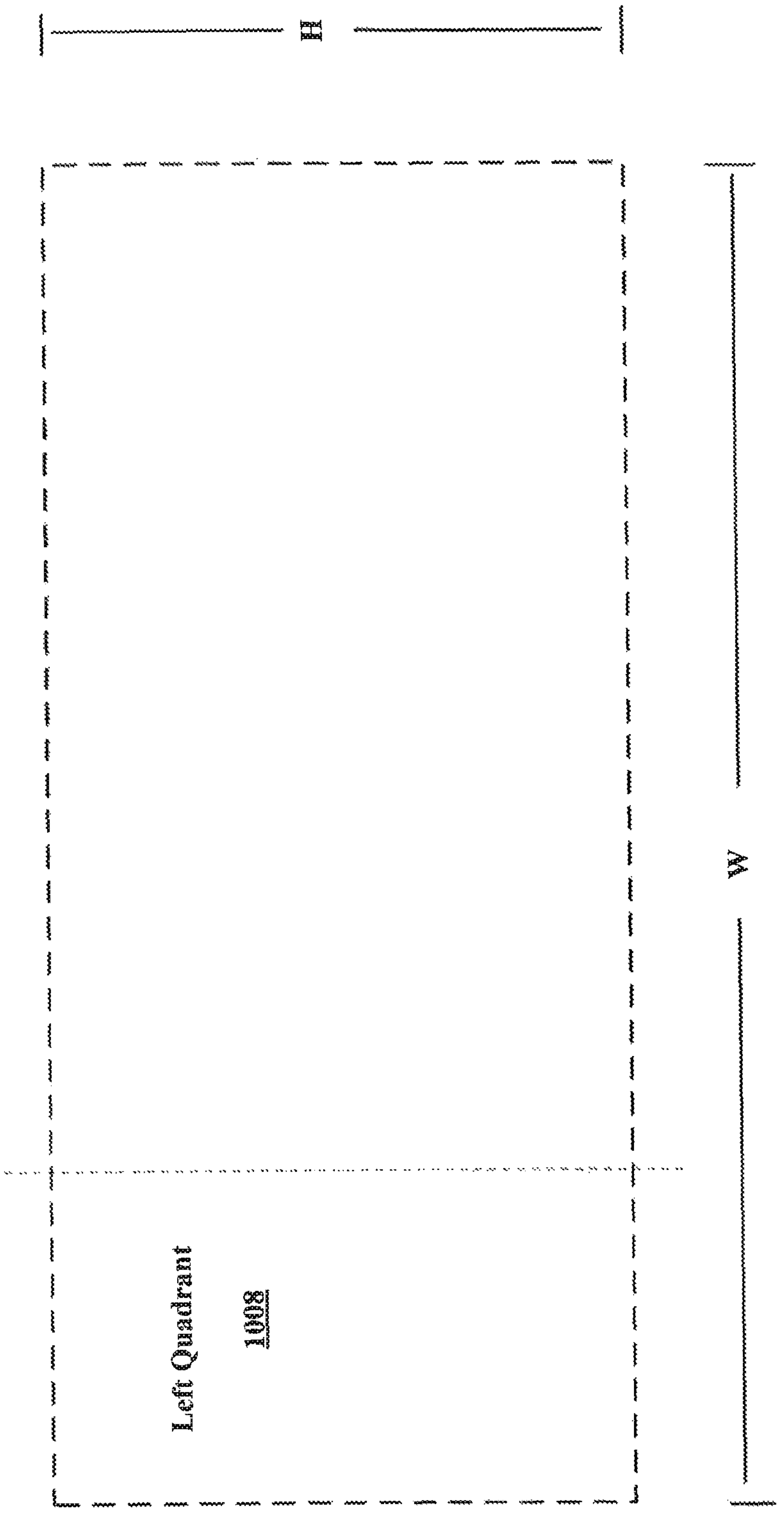
FIG. 12 provides an example of document image Left Quadrant
Figure 13:
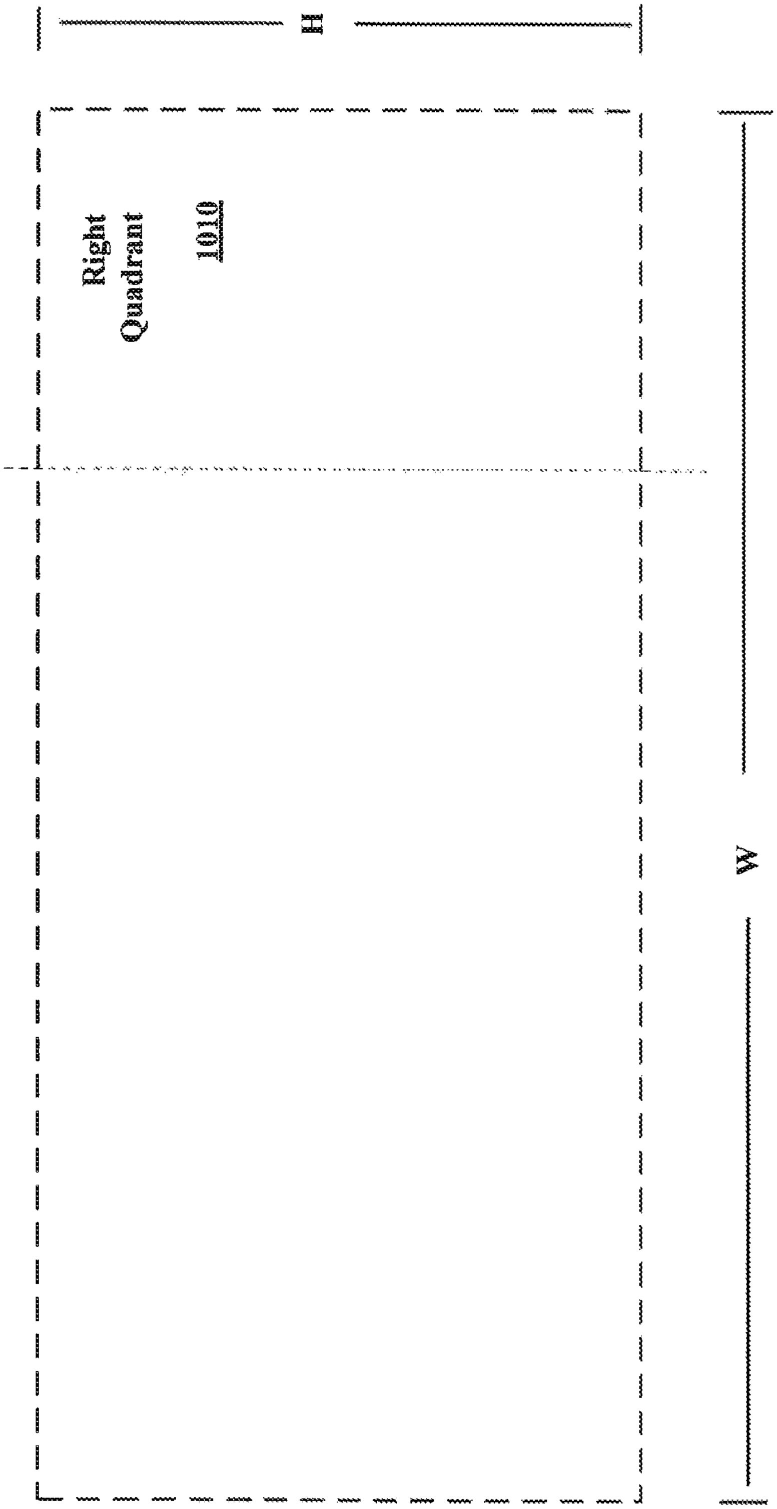
FIG. 13 provides an example of document image Right Quadrant

In some embodiments of the invention, the image is further subdivided into defined subregions or quadrants (the "Quadrants"). Four such Quadrants may be created, each spanning a rectangle that is a set percentage of the horizontal width (for example, 25%) or a set percentage of the vertical height (for example, 40%) of the viewport of the image capturing device. For example, the four Quadrants may be defined in some order of the following:

1. "Upper Quadrant" 1004, starting from top left, go the width of the image to the right, then down 40% of height (see FIG. 10);
2. "Lower Quadrant" 1006, starting from bottom right, go the width of the image, then up 40% of height (see FIG. 11);
3. "Left Quadrant" 1008, starting from bottom left, go the height of the image, then 25% of check width to the right (see FIG. 12); and
4. "Right Quadrant" 1010, starting from top right, go the height of the image down, then go 25% of check width to the left (see FIG. 13)

C. Edge Values

The device may use the blurred pixel values to determine the "strength," or magnitude, of luminosity differences about each pixel location 908 (pixel "edge value"). Calculation of the edge values, or "edge strength" differentials, may be done for both the vertical and the horizontal direction, as described below. The order presented below for determination of each edge value is by way of example only.

1. Horizontal Edge Values

This step involves calculating horizontal edge strength differentials ($E_{h(x,y)}$) for a plurality of pixels, which may be done within each Quadrant. If the location of a blurred pixel, $P_{x,y}$, is given by the coordinates x, y, then the location of each of the neighboring pixels, $P_{x\pm i,\,y\pm j}$, may be given by its distance from $P_{x,y}$; that is, where i and j may designate the respective number of rows and columns, or other incremental measurement of distance, from pixel $P_{x,y}$ that the neighboring pixel is located. The device may adjust or weight these blurred values of the pixels, $P_{x\pm i,\,y\pm i}$, in the neighborhood around the pixel location $P_{x,y}$ to help evaluate the "edge value" (that is, the luminosity strength differential about the location) of pixel $P_{x,y}$.

To determine horizontal edge values, the device may first multiply the blurred values of the neighboring pixels by the corresponding value in a "h-differential" kernel matrix. An example of the form of such a matrix is:

h-differential kernel:

$$\begin{array}{ccccccccc} X_{x-4,y+2} & 0 & X_{x-2,y+2} & 0 & X_{x,y+2} & 0 & X_{x+2,y+2} & 0 & X_{x+4,y+2} \\ 0 & 0 & 0 & 0 & 0 & 0 & 0 & 0 & 0 \\ 0 & 0 & 0 & 0 & X_{x,y} & 0 & 0 & 0 & 0 \\ 0 & 0 & 0 & 0 & 0 & 0 & 0 & 0 & 0 \\ X_{x-4,y-2} & 0 & X_{x-2,y-2} & 0 & X_{x,y-2} & 0 & X_{x+2,y-2} & 0 & X_{x+4,y-2} \end{array}$$

The pixel values in the neighborhood above the target pixel are multiplied by the corresponding kernel factors and are summed and averaged. Similarly, the pixel values in the neighborhood below the target are multiplied by their corresponding factors and are summed and averaged. The absolute value of the difference between the two averages may establish the horizontal edge value ($E_{h(x,y)}$)for the target pixel location $P_{x,y}$. That is, $$E_{h(x,y)}=|\{(P_{x-4,y+2}*X_{x-4,y+2)})+(P_{x-2,y+2}*X_{x-2,y+2)})+\ldots+(P_{x+4,y+2}*X_{x+42,y+2)})\}/\Sigma X_{i,y=2)})-|\{(P_{x-4,y-2}*X_{x-4,y-2)})+(P_{x-2,y-2}*X_{x-2,y-2)})+\ldots+(P_{x+4,y-2}X_{x+42,y-2)})\}/\Sigma X_{i,y=-2)})|$$

When utilizing a kernel such as that shown above, the device may ignore one or more rows of pixels above and below the point of interest ("Gap") to help account for some skewing of the image that may have occurred when captured, and to more efficiently identify the approximate edge strength due to the somewhat broader luminosity transition area across several rows of pixels caused by the blurring.

The following provides an example of such a kernel for calculating horizontal edge values.

h-differential kernel (numerical example):

$$\begin{array}{ccccccccc} 1 & 0 & 1 & 0 & 2 & 0 & 1 & 0 & 1 \\ 0 & 0 & 0 & 0 & 0 & 0 & 0 & 0 & 0 \\ 0 & 0 & 0 & 0 & X_{a,b} & 0 & 0 & 0 & 0 \\ 0 & 0 & 0 & 0 & 0 & 0 & 0 & 0 & 0 \\ -1 & 0 & -1 & 0 & -2 & 0 & -1 & 0 & -1 \end{array}$$

That is, in the above example, the device may create a new matrix for each blurred pixel value $P_{a,b}$ by multiplying the luminosity of each pixel in its neighborhood, $P_{a\pm i,\ b\pm j}$, by its corresponding h-differential kernel value at $X_{a\pm i,\ b\pm j}$ (that is, $P_{a\pm i,\ b\pm j}\cdot X_{a\pm i,\ b\pm j}$). In this example, there will be 5 non-zero values above, and 5 non-zero values below, the target pixel value, $P_{a,b}$.

The device may then sum the resulting products in the rows above the target pixel and average, and separately sum the resulting products in the rows below the target pixel and average. The difference between the two luminosity averages is then calculated as a horizontal edge value at that location ($E_{h(a,b)}$). That is, in the example shown, the horizontal edge value at a given pixel ($P_{a,b}$) has an absolute value of:

$$E_{h(a,b)}=|\{(P_{a-4,b-2}+P_{a-2,b-2}+(2*P_{a,b-2})+P_{a+2,b-2}+P_{a+4,b-2})/6\}-\{(P_{a-4,b+2}+P_{a-2,b+2}+(2*P_{a,b+2})+P_{a+2,b+2}+P_{a+4,b+2})/6\}|$$

When determining the horizontal edge values, the device may apply the preceding method to both the Upper Quadrant 1004 and the Lower Quadrant 1006 subregions.

2. Vertical Edge Values

The device may apply a similar procedure, which may be carried out in both the Left Quadrant 1008 and the Right Quadrant 1010, for locating the vertical edge values. Similar to the method as described above, to determine vertical edge values, the device may first multiply the blurred values of the neighboring pixels by the corresponding value in a v-differential kernel matrix. An example of such a matrix is:

v-differential kernel:

$$\begin{array}{ccccc} X_{x-2,y+4} & 0 & 0 & 0 & X_{x+2,y+4} \\ 0 & 0 & 0 & 0 & 0 \\ X_{x-2,y+2} & 0 & 0 & 0 & X_{x+2,y+2} \\ 0 & 0 & 0 & 0 & 0 \\ X_{x-2,y} & 0 & X_{x,y} & 0 & X_{x+2,y} \\ 0 & 0 & 0 & 0 & 0 \\ X_{x-2,y-2} & 0 & 0 & 0 & X_{X+2,y-2} \\ 0 & 0 & 0 & 0 & 0 \\ X_{x-2,y-4} & 0 & 0 & 0 & X_{x+2,y-4} \end{array}$$

Each of the pixel luminosity values in the neighborhood to the left of the target pixel location is multiplied by its corresponding kernel factors, and the products are summed and averaged. Similarly, each of the pixel luminosity values in the neighborhood to the right of the target pixel location is multiplied by its corresponding kernel factor, and the products are summed and averaged. The difference between the averages of the two sums establishes the vertical edge value ($E_{v(x,y)}$) for the target pixel location $P_{x,y}$. That is, $$E_{v(x,y)}=|\{(P_{x-2,y+4}*X_{x-2,y+4)})+(P_{x-2,y+2}*X_{x-2,y+2)})+\ldots+(P_{x-2,y-4}*X_{x-2,y-4)})\}/\Sigma X_{x-2,i)})-|\{(P_{x+2,y+4}*X_{x+2,y+4)})+(P_{x+2,y+2}*X_{x+2,y+2)})+\ldots+(P_{x+2,y-4}*X_{x+2,y-4)})\}/\Sigma X_{x+2,i)})|$$

As when applying a kernel to determine horizontal edge values, the device may ignore one or more rows of pixels to the left and to the right of the point of interest to help account for some skewing of the image that may have occurred when captured, and to more efficiently identify the approximate edge strength due to the somewhat broader luminosity transition area across several rows of pixels caused by the blurring.

The following provides an example of such a kernel for locating candidate vertical edge locations in the Upper Quadrant 1004 and Lower Quadrant 1006.

v-differential kernel (numerical example):

$$\begin{array}{ccccc} 1 & 0 & 0 & 0 & -1 \\ 0 & 0 & 0 & 0 & 0 \\ 1 & 0 & 0 & 0 & -1 \\ 0 & 0 & 0 & 0 & 0 \\ 2 & 0 & X_{a,b} & 0 & -2 \\ 0 & 0 & 0 & 0 & 0 \\ 1 & 0 & 0 & 0 & -1 \end{array}$$

-continued

| | | | | |
|---|---|---|---|---|
| 0 | 0 | 0 | 0 | 0 |
| 1 | 0 | 0 | 0 | −1 |

That is, in the above example, the device may create a new matrix for each blurred pixel value $P_{x,y}$ by multiplying the luminosity of each pixel in its neighborhood, $P_{a\pm i,\ b\pm j}$, by its corresponding v-differential kernel value at $X_{x\pm i,\ y\pm j}$ (that is, $P_{x\pm i,\ y\pm j} \cdot X_{x\pm i,\ y\pm j}$). In this example, there will be five non-zero values to the left, and five non-zero values to the right, of the target pixel value, $P_{x,y}$.

The device then may sum the resulting products in the column to the left of the target pixel and average, and separately sum the resulting products in the column of pixels to the right of the target pixel and average. The difference between the two luminosity averages is then calculated as a vertical edge value at that location ($E_{v(x,y)}$). That is, in the example shown, the candidate vertical edge value at a given pixel ($P_{x,y}$) has an absolute value of:

$$E_{v(x,y)}=|\{(P_{x-4,y-2}+P_{x-2,y-2}+(2*P_{x,y-2})+P_{x+2,y-2}+P_{x+4,y-2})/6\}-\{(P_{x-4,y+2}+P_{x-2,y+2}+(2*P_{x,y+2})+P_{x+2,y+2}+P_{x+4,y+2})/6\}|$$

When determining the vertical edge values, the device may apply the preceding method to both the Left Quadrant 1008 and the Right Quadrant 1010 subregions.

In summary, the device may create edge value "maps," $E_q$, defining luminosity differences about each of the pixel locations, $E_{q(x,y)}$. In the examples above, for each of the Upper and Lower Quadrants, each edge value is given by:

$$E_{h(x,y)}=|((p_{x-2,y+4}+p_{x-2,y+2}+(2*p_{x-2,y})+p_{x-2,y-2}+p_{x-2,y-4})/6)-((p_{x+2,y+4}+p_{x+2,y+2}+(2*p_{x+2,y+2})+p_{x+2,y+2}+p_{x+4,y+2})/6)|$$

Similarly, for each of the Left and Right Quadrants, the device in the example above may create an edge value map defining the vertical edge value of each pixel location as:

$$E_{v(x,y)}=|((p_{x-2,y-4}+p_{x-2,y-2}+(2*p_{x-2,y})+p_{x-2,y+2}+p_{x-2,y+4})/6)-((p_{x+2,y-4}+p_{x+2,y-2}+(2*p_{x+2,y})+p_{x+2,y-2}+p_{x+2,y-4})/6)|$$

Typically, all edge values will be rounded to the nearest integer.

D. Threshold Values

The device may then determine threshold values 910 to eliminate certain pixel locations that are unlikely to denote an edge location. It may determine two horizontal thresholds, one for the Upper Quadrant 1004 and one for the lower Quadrant 1006. It may also determine two vertical thresholds, one for the Left Quadrant 1008 and one for the Right Quadrant 1010. The device may calculate the thresholds as follows:

create a histogram H[0, 1, 2, . . . 255] of the pixel edge values for each quadrant. Each edge value $E_{q(x,y)}$ will have a value of an integer from 0 to an upper value, such as 255. The device will count the number of occurrences of edge values with each integer value;

determine an average edge value A, where A may be the average of all non-zero edge values from the histogram; and set the threshold ($T_q$) to be $T_q$=A*2.0 where $T_q$ typically will be rounded to an incremental value such as an integer.

If done for each of four Quadrants, this will result in four threshold values, two for horizontal edges (upper and lower), two for vertical edges (left and right). Generally, higher thresholds ($T_q$) will be indicative of a higher average variation in luminosity in the given quadrant, suggesting a sharper edge. A fairly plain image (e.g. the back of a check on a plain white desk surface) without much variation will yield a lower threshold ($T_q$).

As a result of the preceding steps, the device will have produced edge value maps for the horizontal and for the vertical directions ($E_{h(x,y)}$ and $E_{v(x,y)}$), each containing edge values, along with four thresholds $T_{hupper}$, $T_{hlower}$, $T_{vleft}$, $T_{vright}$; that is, one Quadrant threshold value ($T_q$) for each Quadrant.

E. Thinning

1. Threshold Test

The device may use the calculated threshold value ($T_q$) for each respective Quadrant to thin the edge value maps 912, $E_{h(x,y)}$ and $E_{v(x,y)}$, to show only edge peaks, typically along rows or columns of pixel locations. It may do so by applying a threshold test, assessing each edge value against its respective quadrant threshold value ($T_q$).

For example, if an edge value ($E_{q(a,b)}$) is less than the threshold value $T_q$ (that is, $E_{q(a,b)}<T_q$), then the device may set $E_{q(a,b)}=0$. Thus, by way of further example, if the device has calculated $T_{hupper}$=006, it may convert the following hypothetical nine contiguous edge values calculated at x=a, $E_{h(a,y)}$, on the document:

000 004 005 006 012 010 005 004 001 to:

000 000 000 006 012 010 000 000 000

That is, the device will reset the edge values such that only the pixel locations with edge values greater than or equal to the threshold will have a non-zero value. One consequence will be that entire rows or columns of edge values will be eliminated if no edge value in the run equals or exceeds the threshold value.

2. Thinning

The device may then thin the remaining non-zero edge values. It may do so by setting all but the highest value in each contiguous run of edge values to 0.

For example, the edge value run from the preceding thresholding step 000 000 000 006 012 010 000 000 000 when thinned by the device, may become simply:

000 000 000 000 012 000 000 000 000.

That is, for the specific edge run $E_{h(a,y)}$, the device retains for further processing only the peak edge value, which in the above case was 012.

Thus, the device may maintain revised horizontal and vertical edge value maps, $E'_{h(x,y)}$ and $E'_{v(x,y)}$, each containing only "peak" edge values with all other pixel location edge values set to zero. This will result in "thin" identified edge location candidates along any row or column of pixel locations within the document image or image subregion, typically 1 pixel wide.

F. Edge Pixel Clustering

1. Cluster Identification

By applying the above process to the document image, the device may identify small groups of significant edge values that may be the result of miscellaneous writing, stray marks, preprinted lines or other non-edge demarcations on the document. The device can eliminate these extraneous, "false" edge identifications by "clustering" 914.

The device may do so by linking contiguous, non-zero peak edge values into "clusters." It may determine, for example, that a pixel (A) with a, edge value determined to be a peak and whose location in the x.y coordinate system is given by u,v is "connected" to edge pixel (B) with x,y coordinates m,n if each is non-zero and $(-1<u-m<1)$ and $(-1<v-n<1)$; that is, it may "connect" pixels with non-zero edge values that are +/−1 pixel distance of each other. As a simple example, the device may determine that all pixels Y with non-zero edge values are connected to pixel X in the following matrix:

YYY

YXY

YYY

The device will not treat zero values as part of a cluster; rather, as a result of thresholding and thinning, it will treat as a cluster only edge (peak) pixels.

By way of further example, consider the following thinned edge map showing non-zero values around pixel location X for only those locations with peak edge values:

| | | | | |
|---|---|---|---|---|
| 0 | 0 | 0 | 0 | 0 |
| 0 | 0 | 0 | Y | 0 |
| 0 | 0 | X | 0 | 0 |
| 0 | 0 | Y | Y | 0 |
| N | 0 | 0 | 0 | 0 |

If the pixel at X also has a non-zero peak edge value, the device will treat the three non-zero Y pixels as contiguous and part of the cluster. It will not treat the non-zero N pixel as contiguous since it is not contiguously "connected." There are thus a total of four pixel locations in this cluster example: X and the three "connected" (Y) pixels.

2. Determine Cluster Candidates of Sufficient Length and Orientation

Each cluster that the device identifies is a significant change in luminosity and thus a potential edge location. Actual edges, however, must be of sufficient length and orientation. The device thus may determine cluster candidates 916 by eliminating those clusters of insufficient length or improper orientation to constitute an edge.

Figure 14:
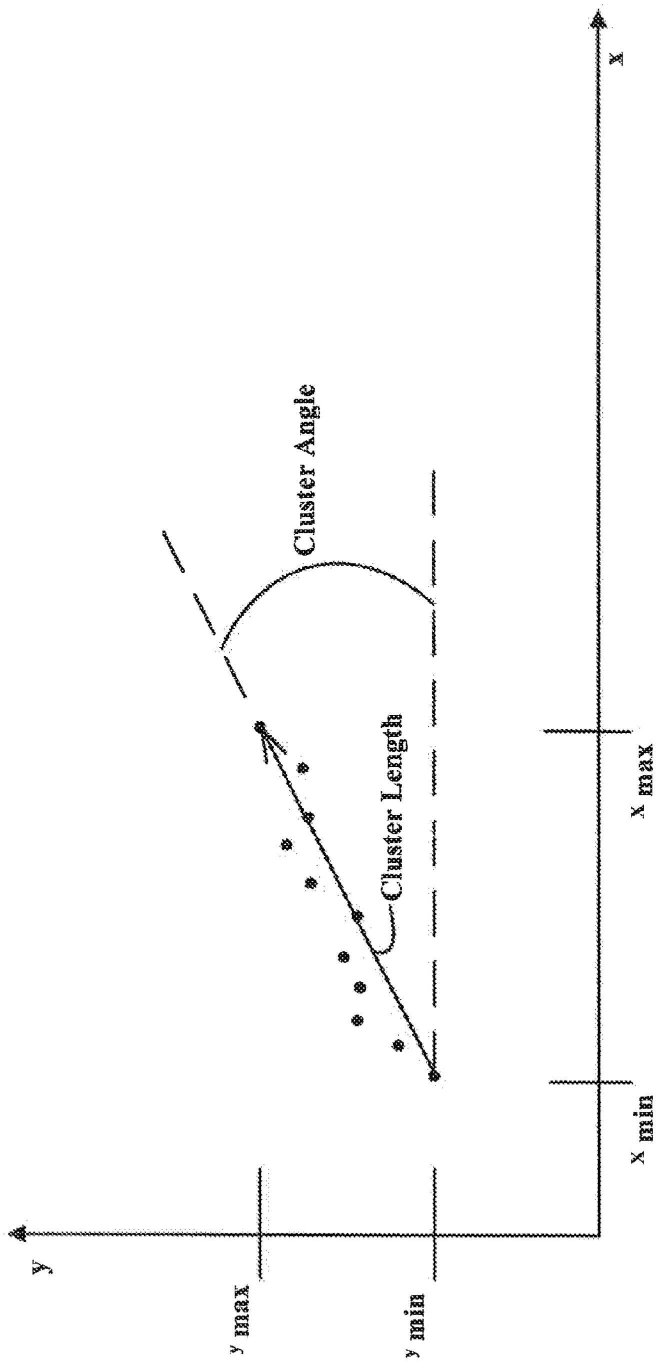
FIG. 14 provides an example of a cluster length and angle calculation

To do so, for each cluster, the device may further analyze in the x.y coordinate system and determine the minimum and maximum x,y coordinate values ($x_{min}$, $x_{max}$, $y_{min}$, $y_{max}$) of all pixel locations included in the cluster and then calculate an effective "length" (width or height) and relative "angle" of the cluster by applying the following formulas (see FIG. 14):

For non-trivial horizontal clusters (where, e.g., $x_{max}-x_{min}\neq 0$):

$$\text{cluster angle}=\arctan((y_{max}-y_{min})/(x_{max}-x_{min}));$$

$$\text{length}=x_{max}-x_{min}$$

For non-trivial vertical clusters (where $y_{max}-y_{min}\neq 0$):

$$\text{cluster angle}=\arctan((x_{max}-x_{min})/(y_{max}-y_{min}));$$

$$\text{length}=y_{max}-y_{min}$$

Any pixel clusters that fall below a minimum width (horizontal cluster) or height (vertical cluster) are of insufficient length to be an edge and thus are discarded. Likewise, any pixel clusters whose angles are outside of a range representing approximate horizontal or vertical orientation (e.g., lines with angles to the horizontal that are outside of a +/−15 degrees range, and lines with angles to vertical that are outside of a +/−30 degrees range) also are discarded.

For each set of candidate edge values, $E_h$ and $E_v$, and assuming continued use of the x.y coordinate system at this point, the device now contains an array of x,y coordinate pairs, $C_h[x,y]$ and $C_v[x,y]$, that are pixel locations that are significant candidate edge locations.

G. Transformation of Candidate Edge Locations to Candidate Edge Lines

The device may now create candidate lines for each pair of candidate x,y coordinate pairs in the C[x.y] array of candidate clustered locations by transforming each of those coordinates into a finite number of line equations 918.

Figure 15:
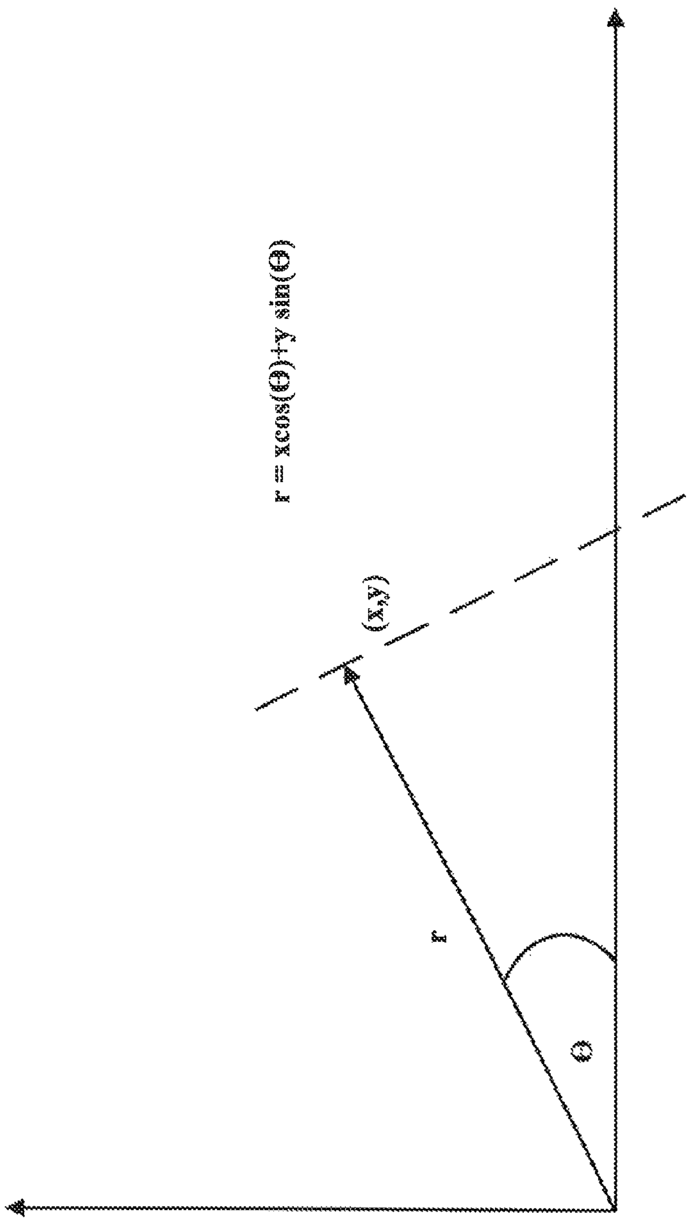
FIG. 15 illustrates a standard Hough transformation equation

For example, FIG. 15 illustrates the use of the Standard Hough Transform:

$$r=x^*\cos(\theta)+y^*\sin(\theta),$$

where r is the perpendicular distance from the origin to a line passing through the candidate point x,y and θ is the angle formed by r with the relevant axis. The relevant value of r may be constrained, such as by the length and width of the image, and θ may be constrained by the approximate horizontal and vertical orientation of the respective edges of the imaged document.

For each x,y pair, various r values may be calculated by rotating the line around the point x,y at specified increments of θ. For example, for horizontal lines, the device may:

- virtually rotate the lines in incremental steps about x,y from θ=−15° thru +15°
- set the rotation steps at 0.3° increments
- r may be rounded to the nearest whole number for vertical lines:

- virtually rotate the lines in incremental steps about x,y from θ=−30° thru +30°
- set the rotation steps at 0.5° increments
- r may be rounded to the nearest whole number The device may calculate the value of r for the virtual parametric line passing thru the point x,y at each increment of the angle θ within the stated bounds, rounding r to the nearest incremental value.

In this example, for each point $x_i,y_j$, the device will virtually create 101 horizontal lines using the equation $$r=x^*\cos(\theta)+y^*\sin(\theta),$$

each line passing through the point $x_i,y_j$, at angles offset incrementally by 0.3° increments; that is, −15°, −14.7°, −14.4°, −14.1° . . . , −0.3°, 0°, 0.3°, . . . 14.4°, 14.7°, 15°, and each line having a corresponding value of r rounded to the nearest incremental value as calculated using the $x_i,y_j$ values and incremental θ.

H. Determine the Equation of the Most Likely Edge Line

1. Accumulation and Sorting of Candidate Lines

The device will thus produce an array of incremental coordinate pairs of $[\theta_i,r_i]$ each defining a line equation. The device may then sum the number of occurrences of each pair of $[\theta_i,r_i]$, creating a histogram $H[r_i,\theta_i]$ that accumulates the number of occurrences of such pairs, each pair defining a line and the number of occurrences of each pair corresponding to the number of edge pixel locations contained within the defined line. That is, multiple occurrences of the same $[r_i,\theta_i]$ pair indicate that the corresponding line passes through multiple candidate edge pixel locations. A high number of occurrences of a specific $[\theta_i,r_i]$ coordinate pair indicates a high number of candidate edge pixel [x,y] locations that the corresponding line passes through. The histogram is sorted in descending order of the number of $[\theta_i,r_i]$ coordinate pairs, thus reflecting the relative "strength" of the potential line location.

This process may be performed by and repeated for each Quadrant, resulting in four histograms, two in the horizontal plane, $H_{hupper}[\theta_i,r_i]$ and $H_{lower}[\theta_i,r_i]$, and two in the vertical plane, $H_{vupper}[\theta_i,r_i]$ and $H_{vlower}[\theta_i,r_i]$.

2. Line Selection

The device may then select the top candidate line or lines 920. This may be done for each Quadrant, such that the top candidates are chosen from each of four histogram arrays $H_{hupper}[\theta_i,r_i]$, $H_{lower}[\theta_i,r_i]$, $H_{vupper}[\theta_i,r_i]$ and $H_{vlower}[\theta_i,r_i]$.

a. Refactoring and Weighting

Figure 16:
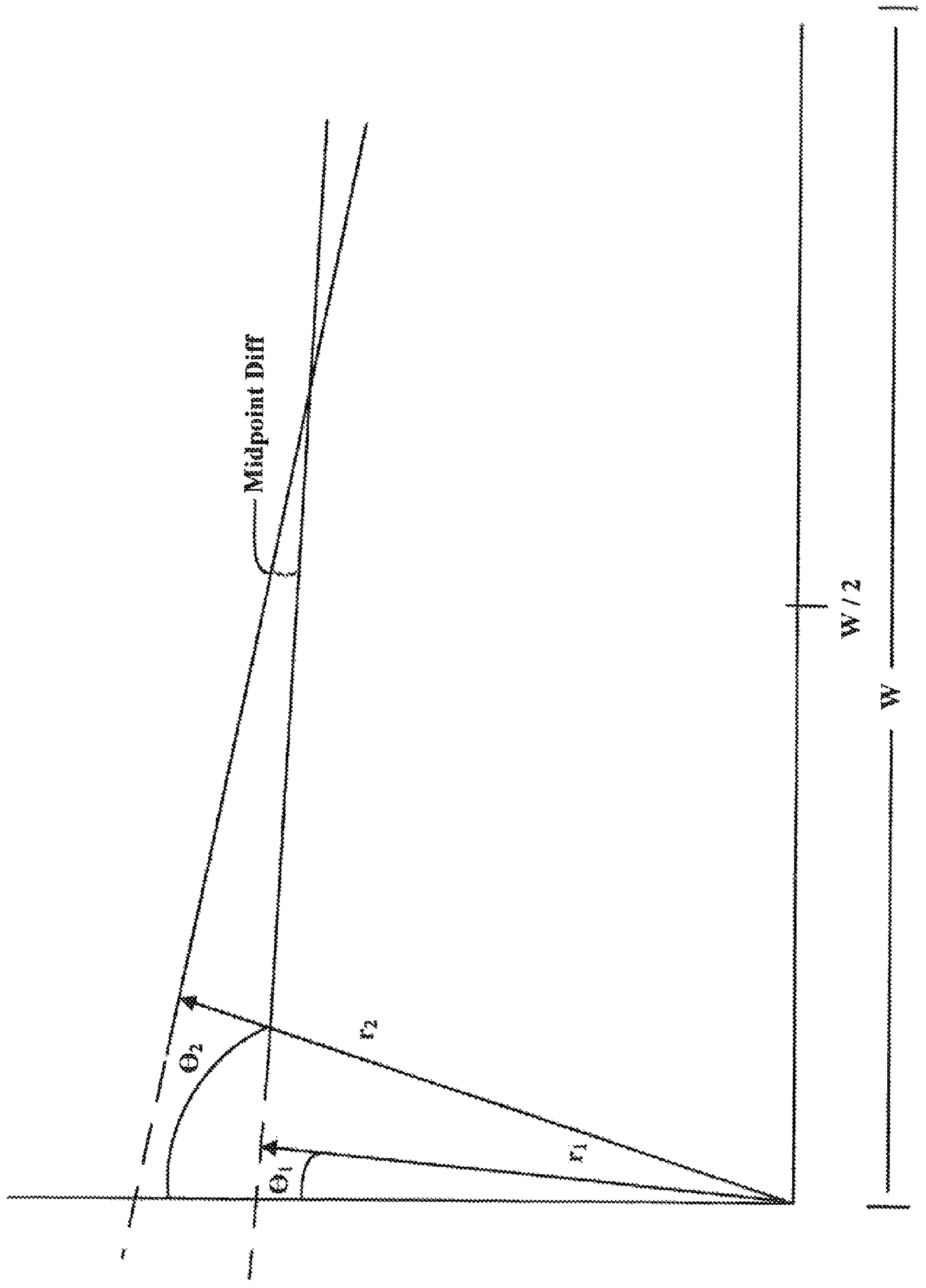
FIG. 16 provides an illustration of calculating the distance at midpoint between two candidate edge lines.

Because document edges are never perfectly straight, there are typically several line candidates corresponding to different θ,r values that intersect and have slightly different angles, or possibly parallel lines that are adjacent, as shown in FIG. 16. The device may employ a weighting process 922 to account for such the multiple line candidates. The candidate lines of greatest significance may be specified as those concurrent in certain regions of the document image, such as those that are proximate at the midpoint of the edge of the image (e.g., x at w/2, and y at h/2).

For each line candidate defined by $[\theta_a,r_a]$ with pixel candidate count $H_a[\theta_a,r_a]$, the device may employ a weighting process, which may consist of adding to that candidate the pixel counts ($H_i[\theta_i,r_i]$, $H_j[\theta_j,r_j]$ . . . ) of neighborhood lines (defined by $[\theta_i,r_i]$, $[\theta_j,r_j]$ . . . ) similar in location and angular orientation (e.g., $\theta_a$+/−four steps, $r_a$+/−two increment lengths), thus increasing the effective pixel count of "strong" lines in some proportion to the occurrence of pixel counts within nearby lines.

For example, the device may perform the following weighting calculations:

$$H_a[\theta_a,r_a]_{weighted}=H_a[\theta_a,r_a]+H_i[\theta_i,r_i]*W_i+H_j[\theta_j,r_j]*W_j+\ldots+H_n[\theta_n,r_n]*W_n$$

where $W_{i \ldots n}$ are weighting factors for the neighborhood lines.

The device may determine the weighting factors of the neighborhood candidate lines based on the proximity of the lines at their midpoints and the similarity of their angles. For example, considering for simplicity only one line (defined by $[\theta_b,r_b]$) in the neighborhood of the line defined by $[\theta_a,r_a]$, the device may calculate the weighted value:

$$H[\theta_a,r_a]_{weighted}=H[\theta_a,r_a]+H[\theta_b,r_b]*W_b$$

The device may set the weighting factor $W_b$ as a function of a constant (weightConstant) and of both the linear proximity (possibly at midpoint edge) ["weightProximity"] and angular similarity ["weightAngle$_{ab}$"] of the line defined by $[\theta_b,r_b]$ to the line defined by $[\theta_a,r_a]$:

$$W_b=\text{weightAngle}_{ab}*\text{weightProximity}*\text{weightConstant}$$

so that $$H[\theta_a,r_a]_{weighted}=H[\theta_a,r_a]+\{H[\theta_b,r_b]*(\text{weightAngle}_{ab}*\text{weightProximity}_{ab}*\text{weightConstant})\}$$

The device may calculate the difference in angles ($\theta\text{Diff}_{ab}$) of the two lines defined for $[\theta_a,r_a]$ and $[\theta_b,r_b]$ as:

$$\theta\text{Diff}_{ab}=|(\theta_a-\theta_b)|.$$

If generally horizontal line candidates, the distance of the two lines defined by $[\theta_a,r_a]$ and $[\theta_b,r_b]$ at the midpoint of a horizontal image edge of interest (MidpointDiff) is approximately the difference in y values of the respective points on those lines at x=w/2; that is:

$$(\text{MidpointDiff})_{x=w/2,y}=|y_{\theta a,ra}-y_{\theta b,rb}|\,|_{(at\ x=w/2)}.$$

Similarly, for generally vertical line candidates, the distance of the two lines defined by $[\theta_a,r_a]$ and $[\theta_b,r_b]$ at the midpoint of a vertical image edge of interest is the difference in x values of the respective points on those lines at y=h/2; that is:

$$(\text{MidpointDiff})_{x,y=h/2}=|x_{\theta a,ra}-x_{\theta b,b}|\,|_{(at\ y=h/2)}.$$

So that superfluous and distant lines are eliminated from consideration, the device may consider only lines with similar angles and locations. It may do so, for example, by considering only lines within a specified proximity at midpoint ("rmidpoint proximity lim") and within a specified "angle proximity lim," which may be set at a number of increasing or decreasing small angle "steps."

The weighting angle value ($\text{weightAngle}_{ab}$) can be set to be:

$$\text{weightAngle}_{ab}=1.0-(\theta\text{Diff}_{ab}/(\text{angle\_step}*\text{angle\_proximity\_lim}));$$

and a weighting of the proximity of the lines (weightProximity$_{ab}$) to be:

$$\text{weightProximity}_{ab}=1.0-(\text{MidpointDiff}/(\text{rmidpoint proximity lim}));$$

For efficiency, the device may consider only neighborhood lines; that is, those with $$\theta\text{Diff}<=(\text{angle\_step}*\text{angle\_proximity\_lim},),$$

and with a proximity given by:

$$\text{rMidpointDiff}<=\text{rmidpoint\_proximity lim}$$

For example, if one sets angle_proximity_lim=4 steps angle_step=±0.3° rmidpoint proximity lim=2 pixels weight constant=0.2 and the device finds the following $[\theta_i,r_i]$ values for two horizontal lines with the corresponding number of pixels shown.

| ⊖ | $y_{\theta,r}$ | # pixels |
|---|---|---|
| 4 | 12 | 400 |
| 3.7 | 12 | 200 |

θDiff=0.3

MidpointDiff=0 weightAngle=1−(0.3/(0.3*4))=0.75 weightProximity=1−(0/2)=1 weighting factor ($W_{4,12}$)=0.75*1*0.2=0.15

Then the device may find the weighted count of the pixel occurrences for [θ=4, r=12] as:

$$H[4,12]_{weighted}=400+(200*15)=430$$

Because the device factors in an adjacent line [θ,r]=[3.7,12], with 200 pixels, it "strengthens" the [4,12] line.

Conversely, factoring in the adjacent [θ,r]=[4,12], with 400 pixels, to the count for [θ,r]=[3.7,12] strengthens the histogram count for [θ,r]=[3.7,12]:

$$H[3.7,12]_{weighted}=200+(400*0.15)=260$$

The device then sorts the $H[\theta_i,r_i]_{weighted}$ in order of number of weighted edge pixels. The lines designated by the coordinates with the highest weighted pixel count are the candidate lines for that quadrant.

b. Locate and Select Outermost Lines

Internal lines printed on a check may cause the device to interpret such lines as an edge of the document. In such cases, the device may find more than one strong edge candidate for a document edge, with a potentially weaker line more to the "outside" of the document image (as calculated above) being the true edge. To address such situations, for each candidate line, the device may identify weaker lines that are towards the edge of the document and have weighted strength $H_s$ $[\theta_s, r_s]_{weighted}$ at some proportionate "strength" relative to the candidate with the highest weighted ranking $[\theta_T, r_T]$. If the "weaker" line has an $\theta_s$ that is within some angular proximity (e.g., +/−2°) of the strongest line, but describes a more external location, the device may choose it at the candidate line 924.

Thus, for example, the device may describe two candidate lines in the Lower Quadrant (where r is measured to the midpoint of the lines from the device's upper left corner), and the corresponding number of pixels captured by the lines, with weighted pixel counts as:

| θ | r | #pixels |
|---|---|---|
| 4 | 12 | 430 |
| 3.7 | 6 | 300 |

In this case, $[\theta_T, r_T]$=(4, 12). Even though line [4,12] is strongest, the line [3.7, 6] is towards the document edge (r=6 is above r=12 in a lower quadrant) and has sufficient strength [300>(430*0.5)] and similar angle [|4−3.7|<=2] to override the [4,12] line such that the device chooses it to become the line for the document edge.

I. Corner Identification

When the device has identified four edge lines, it may set each of the corner locations 926 at the points of intersection of each of two of the lines. That is, if four lines have been found (horizontal upper and lower, vertical left and right), the device may set four corner locations as the x/y coordinates for where the lines cross. These may be designated in the device's x,y coordinate system as upper left corner $(x_{c1}, y_{c1})$, upper right corner $(x_{c2}, y_{c2})$, right lower corner $(x_{c3}, y_{c3})$, and left lower corner $(x_{c4}, y_{c4})$.

IV. Validation

The device may then calculate the output image size and validate it. This may be done by first determining the length of the sides of the output image.

Top Side Length 702 $(L_T)=\sqrt{\{[x_{c,2}-x_{c,1}]^2+[y_{c,2}-y_{c,1}]^2\}}$ Right Side Length 704 $(L_R)=\sqrt{\{[x_{c,3}-x_{c,2}]^2+[y_{c,3}-y_{c,2}]^2\}}$ Bottom Side Length 706 $(L_B)=\sqrt{\{[x_{c,4}-x_{c,3}]^2+[y_{c,4}-y_{c,3}]^2\}}$ Left Side Length 708 $(L_L)=\sqrt{\{[x_{c,1}-x_{c,4}]^2+[y_{c,1}-y_{c,4}]^2\}}$ It then selects the maximum of each of the calculated parallel sides. That is:

Set image width (W) as $W=\max(L_T, L_B)$

Set image height (H) as $H=\max(L_L, L_R)$

The device then verifies that the output size is within defined allowable metrics, such as those established by the Financial Services Technology Consortium.

Figure 5:
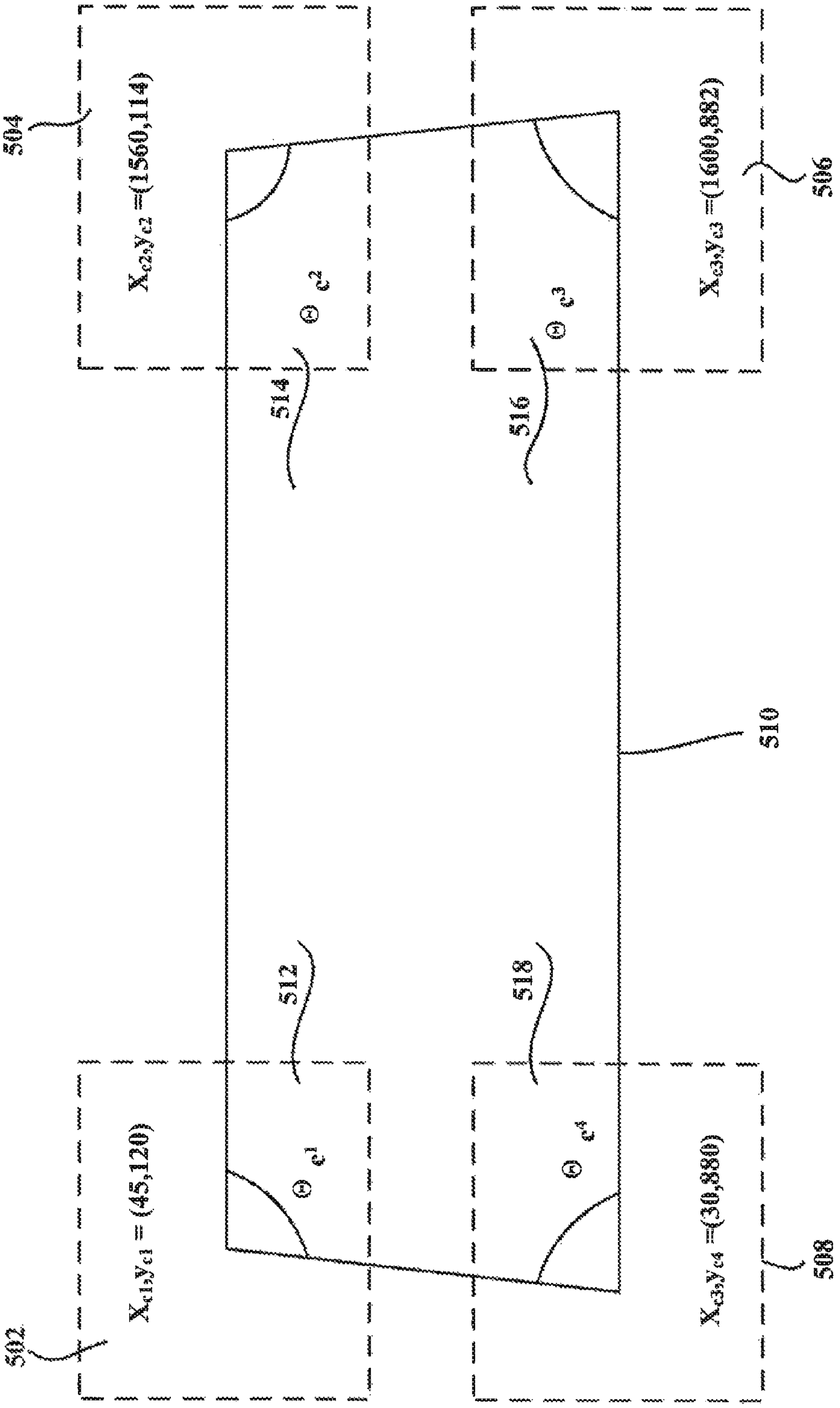
FIG. 5 provides an example of an uncorrected quadrilateral with defined corner coordinates.

By way of validation, the device may check the angles of the original image, see FIG. 5, to verify that they are greater than 80 degrees and less than 100 degrees. It may do so by calculating the angle of corner 1 (upper left) 512:

$$\Theta_{c1}=\cos^{-1}\{[(x_{c,2}-x_{c,1})(x_{c,1}-x_{c,4})+(y_{c,2}-y_{c,1})(y_{c,1}-y_{c,4})]/(L_T)\times(L_T)\}.$$

and determining if $80°\leq\Theta_{c1}\leq 100°$.

It may undertake similar calculations and determinations for $\Theta_{c2}$ 514, $\Theta_{c3}$ 516, and $\Theta_{c4}$ 518.

If any $\Theta_{ci}\leq 80°$ or $100°\leq\Theta c_i$, then the device may reject the image and request that the operator provide a replacement image.

V. Geometric Correction and Scaling

A. Transform Image to Output Rectangle

Figure 7:
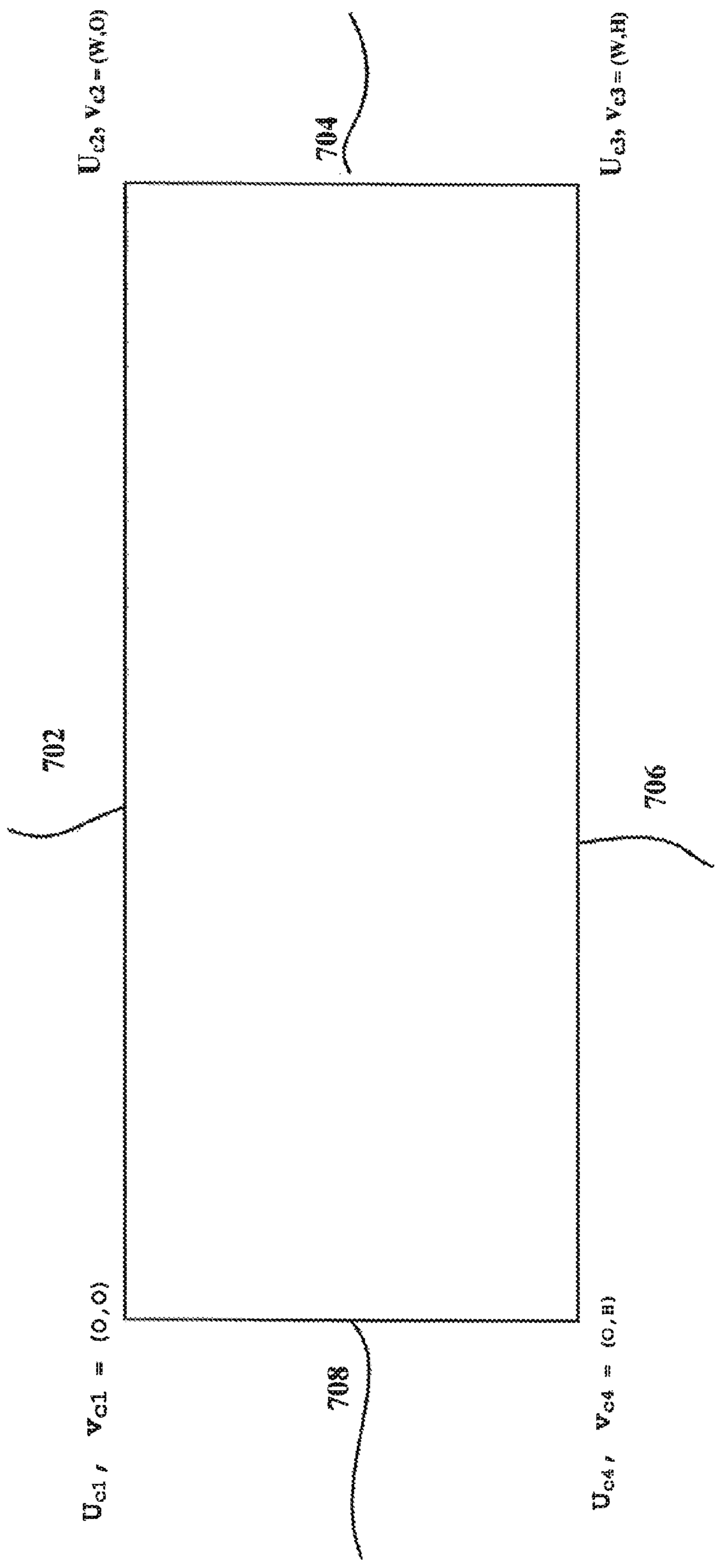
FIG. 7 provides an example of defined corners of an output image rectangle.

The device then employs geometric correction to transform the perspective from the input quadrangle image to an output rectangle image. See FIG. 7. The coordinates of the source corners of the original check image may be denoted as $x_{ci}, y_{ci}$. The device may set the output or "destination" corner coordinates, $u_{ci}, v_{ci}$, for the output rectangle image based upon the width (W) and height (H) calculated above. For example, it may first set $u_{c,1}, v_{c,1}$, for the upper left corner of the output rectangle image to be, $u_{c,1}, v_{c,1}$=(0,0). It may then set the other three destination corners:

$$u_{c,2}, v_{c,2}=(W, 0)$$

$$u_{c,3}, v_{c,3}=(W, H)$$

$$u_{c,4}, v_{c,4}=(0, H)$$

Utilizing these values in a series of linear equations programmed into the device, it transforms all other points utilizing basic perspective transformation mathematics. For example, it may employ the basic perspective transformation equations to calculate the coefficients of perspective transformation to map the original coordinates of each pixel, $x_i, y_i$, to their output destination.

That is:

$$ui = \frac{c_{00} * x_i + c_{01} * y_i + c_{02}}{c_{20} * x_i + c_{21} * y_i + 1}$$

$$vi = \frac{c_{10} * x_i + c_{11} * y_i + c_{12}}{c_{20} * x_i + c_{21} * y_i + 1}$$

where $c_{ij}$ are matrix coefficients. Utilizing the known values for the source corner coordinates and the destination corner coordinates, as determined above, the device may virtually put the linear equations into matrix format, such that the equations are equivalent to the following linear system:

$$\begin{pmatrix} x0 & y0 & 1 & 0 & 0 & 0 & -x0*u0 & -y0*u0 \\ x1 & y1 & 1 & 0 & 0 & 0 & -x1*u1 & -y1*u1 \\ x2 & y2 & 1 & 0 & 0 & 0 & -x2*u2 & -y2*u2 \\ x3 & y3 & 1 & 0 & 0 & 0 & -x3*u3 & -y3*u3 \\ 0 & 0 & 0 & x0 & y0 & 1 & -x0*v0 & -y0*v0 \\ 0 & 0 & 0 & x1 & y1 & 1 & -x1*v1 & -y1*v1 \\ 0 & 0 & 0 & x2 & y2 & 1 & -x2*v2 & -y2*v2 \\ 0 & 0 & 0 & x3 & y3 & 1 & -x3*v3 & -y3*v3 \end{pmatrix} \cdot \begin{pmatrix} c00 \\ c01 \\ c02 \\ c10 \\ c11 \\ c12 \\ c20 \\ c21 \end{pmatrix} = \begin{pmatrix} u0 \\ u1 \\ u2 \\ u3 \\ v0 \\ v1 \\ v2 \\ v3 \end{pmatrix},$$

from which it may calculate the coefficients $(c_{i,j})$ calculated by solving the system for $c_{i,j}$.

The device may solve the linear system by first calculating $M_{i,j}$ as the inverse matrix for $c_{i,j}$. It may then perform the transformation for each pixel at original location $x_i, y_i$ to its destination location according to the following equation:

$$(u_i, v_i) = dst(x_i, y_i) = src\left(\frac{M11*x_i + M12*y_i + M13}{M31*x_i + M32*y_i + M33}, \frac{M21*x_i + M22*y_i + M23}{M31*x_i + M32*y_i + M33}\right)$$

where: $x_i, y_i$)=coordinates of pixel i source image;

src=source pixel color value;

$$(u_i, v_i)=dst(x_i, y_i)=\text{destination (output) image value}$$

The result is a color cropped image 112 of the front of the document. The device may also perform the same process with an image of the back of the document.

B. Scaling.

The device may then perform an operation to scale the image 114 of the front of the document within a specified pixel width range 116. For example, based upon the Federal Reserve Bank's check image processing standard of 200 dots per inch (DPI), the operation may scale a check document image to between 1140 and 1720 pixels. While this typically requires down-scaling, certain devices with low resolution cameras may require an up-scaling operation. It may perform a similar operation to scale the image of the back of the document. The height of the image relies on a width to height aspect ratio and the corresponding number of pixels for the rear image does not have to be an exact match with the front of the check image document.

VI. Color Conversion and Cropping

A. Conversion from Color Image to Black and White Image.

The device may then convert the color image 118 to a black and white image. It may do so by performing a mathematical operation on the image in order to identify a luminosity value for each pixel as it is converted from color to gray scale. For example, it may use the formula: $L=0.299R+0.587G+0.114B$ in which R equals a red value, G equals a green value, B equals a blue value, and L is a resulting luminosity value. The device then evaluates each pixel to determine if it should be converted into a white or black pixel. It may do so in the following manner:

First, it may determine the pixel box blur value ("Blur Value") using the "kernel box blur matrix" shown in FIG. 8. It may average the pixel luminosity with surrounding pixels across a relatively broad area, as defined by the kernel box blur matrix, to define a Blur Value. For example, it may average the pixel luminosity with 16 surrounding pixels across a 15×15 matrix.

Second, it may determine the pixel luminosity ("Luminance") using a "pixel luminance blur matrix":

$$\begin{matrix} 0 & 0 & 1 & 0 & 0 \\ 0 & 0 & 1 & 0 & 0 \\ 1 & 1 & 1 & 1 & 1 \\ 0 & 0 & 1 & 0 & 0 \\ 0 & 0 & 1 & 0 & 0 \end{matrix}$$

It may average the pixel luminosity with near neighbor pixels (for example, 8 near neighbor pixels), as defined by the pixel luminance blur matrix, to define a local blurred pixel value.

Third, it may calculate the difference between the Blur Value and the Luminance and compare it to a threshold value ("Threshold") to determine whether a pixel is black or white. For example, it may do so using the following formula:

If Luminance<(Blur Value−Threshold), then, result is BLACK;

Otherwise, result is WHITE.

Fourth, if it determines a WHITE pixel from the preceding step, but the pixel Luminance (local value) and Blur Value are both below a fixed threshold (the "dark pixel threshold") (which, by way of example, may be set at 35%), then the pixel is nonetheless forced to BLACK.

Fifth, it may measure the darkness of the converted image by dividing the number of black pixels by the total pixels in the document image ("Darkness Ratio"). It may exclude from this measurement a set region around the edges of the document (for example, one-quarter inch). If it calculates that the Darkness Ratio is between predetermined optimal values (for example, 3.5% to 12% for the front image and 0.8% to 12% for the rear image), the operation is complete. If it finds that the Ratio is not within the optimal values, it may adjust the threshold value used in the Third Step, above. That is, if the measured darkness is below the low threshold, the image is too light and needs to be darkened and the device may decrease the black and white conversion threshold value used in the Third Step, above. On the other hand, if the measured darkness is above the high threshold, the image is too dark and needs to be lightened, and the device may increase the black and while threshold value used in the Third Step. It may then again perform the conversion process beginning in the Third Step, above. It may repeat this process until the Darkness Ratio is within the optimal value range or a predetermined number of maximum times; for example, 5 times. The result, if successful, is a cropped, scaled, and black and white image 120. If, after the maximum adjustment and repetitions are performed the Darkness Ratio still is not within optimal values, the device may reject the image.

B. Transmission of the Document Image from Device to Server.

Once the device scales, crops, and converts to black and white the image of the document, it transmits the image 122 to a computer server 124. According to one embodiment of the present invention, it may also transmit a front color image of the document to the server in addition to the black and white front and rear images of the document. It may present the color image to the server in the same scale as the black and white image but may rely upon a lower-quality file.

C. Quality Tests of Black and White Image.

The front side of the converted black and white document image received at the server is subject to analysis through a series of tests and operations on the document image. The back side of the document image may also be subject to analysis through some or all of these tests and operations. In one embodiment of the invention, the testing is performed iteratively, as follows.

After the image is presented to the server, an initial dots per inch (DPI) is set equal to a ratio of the pixel width of the document image (DPW) to an initial test pixel width (TPW). The document is then tested with a document reader software to arrive at an initial quality score (S1) for the image. That score is evaluated and, if further testing is desired, the initial pixel width is increased by an increment to create a second test pixel width (TPW2) and a second DPI (DPI2) is calculated equal to a ratio of DPW to TPW2. The document image is again tested with a document reader software to arrive at a second score (S2) and the results are evaluated. If further testing in desired, the TPW is iteratively increased by an increment to create successive TPWi values and a next iteration DPIi is calculated equal to a ratio of DPW to TPWi. The document is again tested with a document reader software to arrive at an iteration score (Si), and this process is carried out iteratively, which may continue until the TPWi equals or exceeds the pixel width of the document, DPW.

For example, if the document is a check, tests may be performed using available commercial check reading software such as "CheckReader" from A2iA Corporation. The front images may be tested for image quality and usability, amount recognition, and recognition of the MICR codeline, comprising, for example, the following standard fields:

Auxiliary OnUs
Routing number
Field 4
Account number
Process Control/Trancode

The testing of a financial document with an MICR Codeline and document amount may proceed along the following steps:

Step 1.

The image of the document received at the server may be tested for MICR codeline and document amount. For example, this may be done using CheckReader tests for:

Courtesy Amount Recognition ("CAR") and Legal Amount Recognition ("LAR")
MICR Codeline
Check number In some embodiments of the invention, the image is tested multiple times, at virtual sizes of a predetermined width, such as 1200 pixels, up to or beyond the source image pixel width, in various predetermined increments. For example, using 100 pixel increments, the document is tested at certain specific virtual sizes, such as 6", 6½", 7", 7½", 8", and up to the source document size or larger. By way of example, this iterative process may be described as follows:

Where:
InputPixelWidth=pixel width of input cropped image,
i=iteration,
pixelWidth(i)=iteration pixel width,
(pixelWidth+)=amount of increment of pixelWidth for each iteration, such that pixelWidth(i+1)=pixelWidth (i)+pixelWidth+;
pixelWidth(i)≤inputPixelWidth; and
dpi(i)=dpi for iteration (i)

Set document dpi for each iteration to:
dpi(i)=200*[inputPixelWidth/pixelWidth(i)]
Test via a check reader software such as CheckReader
Check reader software return results
Evaluate results
Return to top (until pixelWidth(i)>inputPixelWidth)

If, for example, the input cropped image is 1712 pixels wide, the first test iteration could be done at a pixel width of 1200 (equivalent to a 6" wide image), then at increments of 100 pixels, such that:

InputPixelWidth=1712
pixelWidth(1)=1200
(pixelWidth+)=100:

So that an initial dpi(1) is calculated for the first iteration as $$dpi(1) = 200 * [1712/1200]$$
$$= 285\ DPI$$

Test this first iteration image via a check reader software
Evaluate results
Return to top (until pixelWidth(i)>inputPixelWidth)

The same calculations are then carried out for pixelWidth (i) of 1300, 1400, 1500, 1600, 1700, and 1712.

In one embodiment of the invention, the results of the iterative tests as applied to the MICR Codeline may be evaluated using a weighting process. In this embodiment, for each iteration, the number of characters of the MICR Codeline that are read are multiplied by a factor to calculate a first character weighting factor for that iteration. The number of fields of the MICR line that are read are then multiplied by a second weighting factor to arrive at a fields weighting factor for that iteration. The character weighting value and the fields weighting value for each iteration are then added to the MICR score for that iteration. The best score from all iterations may then be chosen.

In one embodiment, a weighting is applied to each score returned by the check reader test. The weighting takes into account the number of characters observed in the MICR code line, plus the total number of fields read in the MICR code line, as follows:

Where
Weighted Score for iteration (i)=WS(i)
MICR score for iteration (i)=MScore(i)
#-of-characters-read=number of characters read
#-of-fields-read=number of fields read
W1=1$^{st}$ weighting factor
W2=2$^{nd}$ weighting factor
Then WS(i)=MScore(i)+(W1*#-of-characters-read)+(W2*#-of-fields-read)

The resulting best score from all iterations is chosen 126.

For example, if the check reader software CheckReader is used for testing, a MICR score of between 0 and 1000 will be returned, W1=W2=50, and the following weighting formula will be used:

WS(i)=MScore(i)+(50*#-of-characters-read)+(50*#-of-fields-read)

If CheckReader returns a MICR line from the first iteration (where the letters in the returned line shown below merely represent field separators, not characters)

d211391773d12345678c1234c with a Mscore(1)=900, then

#-of-characters-read=21

#-of-fields-read=3, and

WS(1)=900+(50*21)+(50*3)=2100

In one embodiment of the invention, a correct check number may be inserted into the check number field in an image of a MICR Codeine ("check number plugging routine"). This is accomplished by reading the check number printed on the check image document, testing the quality of the read check number to determine a confidence score, and retaining the check number if the confidence score is above a specified value. The check number field within the MICR Codeline is then read and compared to the retained check number. If there is at least a partial match, the retained check number is placed into the check number field of the MICR Codeline.

For example, a check reader software program may be used to identify the check number printed at the top right of a check image document. The program then provides the check number value along with a test score. This result is then stashed if the test score is above a high confidence threshold. If the check number within the MICR code line, or any portion of it, can be read, the stashed result is searched for a match or partial match in order to activate a check number plugging routine as a way of "repairing" the check number field in the MICR code line. This will occur if the parsed value in the code line contains a partial match to the value of the check number read from the top right of the check document.

Additional quality tests 130 may be performed. In one embodiment of the invention, the accuracy of an electronic reading of a MICR Codeline is tested by using a check reading software to provide multiple test result scores corresponding to ranked probabilities of MICR Codeline reads. The read with the top score is selected if all scores equal or exceed a specified high number. If any scores are less than the high number but greater than or equal to a midway number, a specified number of the top ranked reads are considered and only those fields that match across all such reads are accepted. If any of the scores are less than the midway number but greater than a low number, a larger number of the top ranked reads are considered and only those fields that match across all those reads are accepted.

For example, the check reading software may provide test result scores ("confidence scores") for the MICR code line read with multiple ranked probabilities in descending order. If all scores are equal to or exceed a certain high number (for example, 850), the top score is selected and the remainder of the test scores are ignored. If any scores are in the range of greater than or equal to a midway number (for example, 500), but less than the high number, the top two ranked MICR code line reads are used and only those fields that match across both reads are accepted. If any of the scores are greater than or equal to a low number (for example, 200), but less than the midway number, the top three ranked MICR code line reads are used and only those fields that match across all three reads are accepted. This operation may be mated with the check number plugging routine (immediately above) as appropriate.

In some embodiments, the courtesy amount recognition (CAR) and the legal amount recognition (LAR) of the check image document are tested across multiple DPIs, with a score provided for each test. Only the top score provided for amount recognition may be relied upon.

In some embodiments of the invention, the color image of the check document may also be transmitted from the device to the server and used to further test the accuracy of the transmitted check image. If testing of the black and white image indicates that the image is not acceptable because one or more of the routing number, the account number, or all of the Auxiliary OnUs, the Field4, and Process Control fields of the MICR Codeline are missing or illegible on the black and white image, the above described quality tests are performed on the color image of the check document to determine confidence scores for the corresponding fields of the MICR Codeline on the color image 136. The field or fields from said color image are then used when the confidence score for said field or fields exceeds the confidence score for the corresponding field of the black and white image.

For example, if the MICR Codeline field results obtained from the check reader for the black and white image of the financial document reveal that the routing number and/or account number field are missing, or Auxiliary OnUs, Field4, and Process Control fields are all missing, the front color image of the document will be sent to the check reader software. This color image may be processed and analyzed as described above. The document amount and code line for the color image may then be output. If an amount is output and the quality or confidence score for that field from the color image exceeds that of the black/white image, this amount will be applied to the document. A field by field test of the MICR Codeline of the color image of the document may then be performed. If a value is present from the color image, and either the corresponding field value from the black and white image is missing or was read with a lower confidence score than from the color image, the field from the color image will be applied to the document. The score for each field of the MICR code line from the color image is compared to the score from the corresponding field from the MICR code line from the black and white image, and the highest score from each comparison is accepted.

Step 2.

In some embodiments of the invention, quality testing may include image quality, usability and analysis ("IQU&A") testing and optimal document scale determination. Based on the scores derived as described above, which may be weighted, an optimal size and DPI are selected and the image is tested again using a check reader software, such as CheckReader, as follows.

First, the size of the check image document is selected 128 according to where the best overall MICR code line read is obtained. The DPI is then set to this optimal size to enable a second set of image quality and image usability tests 130 to be performed. Detailed MICR code line character results may also be obtained from the check reader software. The optimal scale of the check document image is then determined by measuring the input width of the image in pixels, measuring the height of the transit q-symbol in the MICR code line of the check image in pixels, and scaling the document by multiplying the input width by 25 and dividing the product by the said measured height of the transit q-symbol in pixels.

That is, the height of the transit q-symbol in the MICR code line is measured and compared to a 25 pixel standard. The optimal scale of the document is determined using the following formula:

optimal Width=inputPixelWidth*(25/measuredHeightOfSymbol)

All IQU&A test results, along with the document amount, codeline, and optimal width, may be output.

The invention claimed is:

1. A method for locating and adjusting a document image consisting of a plurality of pixels contained on a mobile image capturing device, comprising:

acquiring an image of a document on the device;

utilizing a non-transitory computer readable medium to determine the location of each edge of the document image based upon analysis of differences in luminosity values about a plurality of the pixel locations, wherein determining the location of each said edge comprises:

a. quantifying a luminosity difference about the two dimensional coordinate location of each of a plurality of pixels in the two-dimensional plane of the image as determined by a first coordinate system;

b. comparing each luminosity difference to a predetermined or calculated threshold value;

c. creating a first set of candidate pixel coordinate locations comprising said pixel locations about which there is a luminosity difference greater than said threshold value;

d. identifying a first set of clusters of candidate pixel locations, wherein said clusters comprise candidate pixel coordinate locations that are contiguous;

e. determining the length of each of a plurality of clusters in said first set of clusters;

f. determining the angle of each of a plurality of said first set of clusters relative to a coordinate axis;

g. creating a second set of candidate coordinate pixel locations comprising the locations of those pixels within said first set of clusters that remain after discarding extraneous clusters, wherein said extraneous clusters comprise:

i. clusters that are less than a minimum length; and ii. clusters with an angle relative to a coordinate axis that is outside of a specified range;

h. determining a first set of pairs of coordinate values in a second two-dimensional coordinate system using the Hough transformation wherein each pair in said first set of pairs of coordinate values defines a line passing through one or more pixel locations in the second set of candidate coordinate pixel locations;

i. selecting from said first set of pairs of coordinate values a pair of coordinate values in said second coordinate system to define an edge line in said second coordinate system;

j. setting said edge line as the location of a document edge.

2. The method of claim 1, wherein the location of each document corner of the document image is selected as the location where two said edge lines intersect.

3. The method of claim 1, wherein, prior to determining the location of the edges of the document image, the luminosity value of a plurality of the pixels are adjusted, wherein the adjustment of luminosity value of each of the pixels comprises blurring the luminosity value of the pixel based upon its luminosity value and the luminosity value of other pixels within a specified distance from the pixel.

4. The method of claim 1, wherein determining the location of each document edge is carried out within a plurality of subregions of the document.

5. The method of claim 1, wherein the threshold value is dependent upon the luminosity value of a plurality of the pixels.

6. The method of claim 1, wherein the pixels in the neighborhood of each pixel about which a luminosity difference is quantified is adjusted or weighted prior to said quantification.

7. The method of claim 1, wherein selecting from said first set of pairs of coordinate values a pair of coordinate values in said second coordinate system to define an edge line in said second coordinate system comprises:

a. summing the occurrences of like pairs of said coordinate values within said set of pairs of coordinate values;

b. determining a finite set of pairs of said coordinate values in the second coordinate system with a significant number of occurrences;

c. selecting, from said finite set of pairs of coordinate values in said second coordinate system, a pair of coordinate values to define an edge line in said second coordinate system.

8. The method of claim 7, wherein selecting, from said finite set of pairs of coordinate values in said second coordinate system, a pair of coordinate values to define an edge line in said second coordinate system further comprises first weighting each of a plurality of pairs of coordinate values in said finite set in proportion to the magnitude and proximity of other pairs of coordinate values in said set.

9. The method of claim 7, wherein selecting, from said finite set of pairs of coordinate values in said second coordinate system, a pair of coordinate values to define an edge line in said second coordinate system further comprises:

a. determining the pair of coordinate values within said finite set with the highest number of occurrences;

b. creating a second finite set of pairs of coordinate values containing said pair of coordinate values with the highest number of occurrences and other proximate coordinate pairs with a defined percentage of such highest number of occurrences;

c. selecting the coordinate pair from said second finite set that coordinate pair that defines the most outermost line of a region of the document image.

* * * * *